(12) United States Patent
Washisu

(10) Patent No.: US 7,983,546 B2
(45) Date of Patent: Jul. 19, 2011

(54) OPTICAL IMAGE STABILIZER AND OPTICAL APPARATUS

(75) Inventor: Koichi Washisu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 79 days.

(21) Appl. No.: 12/593,832

(22) PCT Filed: May 16, 2008

(86) PCT No.: PCT/JP2008/059489
§ 371 (c)(1),
(2), (4) Date: Sep. 29, 2009

(87) PCT Pub. No.: WO2008/143331
PCT Pub. Date: Nov. 27, 2008

(65) Prior Publication Data
US 2010/0118402 A1   May 13, 2010

(30) Foreign Application Priority Data
May 22, 2007   (JP) ................................. 2007-134875

(51) Int. Cl.
*G03B 17/00* (2006.01)
(52) U.S. Cl. ...................... 396/55; 359/557; 348/208.99
(58) Field of Classification Search .............. 396/52–55; 359/554–557; 348/208.99, 208.7–208.11
See application file for complete search history.

(56) References Cited

U.S. PATENT DOCUMENTS

| 5,768,016 | A | * | 6/1998 | Kanbara | .................... 359/557 |
| 5,835,799 | A | * | 11/1998 | Washisu | ........................ 396/55 |
| 6,018,420 | A | | 1/2000 | Hirunuma et al. | |
| 6,057,963 | A | * | 5/2000 | Hirunuma et al. | ............ 359/557 |
| 6,064,827 | A | | 5/2000 | Toyoda | |
| 6,108,134 | A | * | 8/2000 | Hirunuma et al. | ............ 359/557 |
| 6,606,456 | B2 | * | 8/2003 | Fujinaga | ......................... 396/55 |
| 7,466,910 | B2 | * | 12/2008 | Akada et al. | .................... 396/55 |
| 2006/0127074 | A1 | | 6/2006 | Noji | |
| 2009/0262425 | A1 | * | 10/2009 | Kimura | ......................... 359/557 |
| 2009/0263116 | A1 | * | 10/2009 | Saito | ............................... 396/55 |

FOREIGN PATENT DOCUMENTS

| JP | 02-162320 A | 6/1990 |
| JP | 08-184870 A | 7/1996 |
| JP | 09-288289 A | 11/1997 |
| JP | 10-319465 A | 12/1998 |
| JP | 11-167074 A | 6/1999 |
| JP | 3445002 B | 9/2003 |
| JP | 2006-174588 A | 6/2006 |
| JP | 2007-108557 A | 4/2007 |

* cited by examiner

*Primary Examiner* — Mark Consilvio
(74) *Attorney, Agent, or Firm* — Cowan, Liebowitz & Latman, P.C.

(57) ABSTRACT

The optical image stabilizer (100) includes a first movable part including a first lens (11a) having one of positive and negative optical powers, a second movable part including a second lens (11b) having the other of the optical powers, and an actuator driving the first and second movable parts in the directions opposite to each other with respect to a supporting member (13). The actuator includes a first element (110a, 110b) provided on the supporting member, a second element (16a, 16b) provided on the first movable part and facing a first face of the first element, and a third element (16c, 16d) provided on the second movable part and facing a second face formed on an opposite side of the first element from the first face. The first element is one of a magnet and a coil, and the second element and the third element are the other of them.

12 Claims, 17 Drawing Sheets

OPTICAL IMAGE STABILIZER AND OPTICAL APPARATUS

TECHNICAL FIELD

The present invention relates to an optical image stabilizer that moves a lens in a direction different from an optical axis direction to perform image stabilization, an optical apparatus including the same, and an image-pickup apparatus such as an interchangeable lens and an observation apparatus.

BACKGROUND ART

Such an optical apparatus frequently includes, in order to suppress an image shake due to hand jiggling or the like, the optical image stabilizer (hereinafter simply referred to as image stabilizer) that moves a correction lens in a direction different from that of the optical axis (e.g., a pitch direction and a yaw direction which are orthogonal to the optical axis).

Japanese Patent Laid-Open No. 8-184870 discloses an image stabilizer in which a correction lens is supported by springs and is held at a neutral position in a non-image stabilizing operation state, and the correction lens is moved with a driving force generated by an actuator against the forces of the springs in an image stabilizing operation state. In such a spring-hanging-type image stabilizer, it is not necessary to detect the position of the correction lens, that is, it is not necessary to include a position detection mechanism for the correction lens, which easily reduces the size and manufacturing cost of the image stabilizer.

However, in the spring-hanging-type image stabilizer, the increase of the weight of the correction lens makes it difficult to hold the correction lens at the neutral position only by the springs. This makes an image shift amount on an image-forming plane large in the non-image stabilizing operation state.

On the other hand, when a spring constant of the springs is increased in accordance with the increased weight of the correction lens, the driving force required to drive the correction lens against the spring force in the image stabilizing operation state is increased, which increases the size of the actuator and a battery consumption amount.

Further, even when the correction lens has a small weight, increasing the driving stroke of the correction lens for the purpose of obtaining an image stabilizing effect for a certain degree of large shake increases power supplied to the actuator, which increases a battery consumption amount.

In order to solve such disadvantages, Japanese Patent Laid-Open Nos. 2-162320 and 11-167074 disclose a method to move the correction lenses having optical powers opposite to each other in directions opposite to each other to reduce the weight of each of the correction lens or to suppress the driving stroke thereof.

However, in the image stabilizer disclosed in Japanese Patent Laid-Open No. 2-162320, a long link mechanism for balancing the correction lenses having the opposite optical powers extends in the optical axis direction, which increases the size of the image stabilizer. Furthermore, the correction lens can rotate around the center on the optical axis via the link mechanism. If the correction lens displaces in the optical axis direction due to the rotation thereof, a focal shift may occur.

The image stabilizer disclosed in Japanese Patent Laid-Open No. 11-167074 is used for binoculars. This image stabilizer uses a motor and a feed screw to drive the correction lens, which makes it difficult to achieve high-speed driving and good positional accuracy of the correction lens. In addition, this image stabilizer drives separate correction lenses in the pitch direction and the yaw direction, so that it is difficult to reduce the size.

DISCLOSURE OF INVENTION

The present invention provides a compact optical image stabilizer that includes a correction lens having a lighter weight, that can provide an image stabilizing effect to a larger shake while reducing a driving stroke of the correction lens, and that enables reduction of focal shifts and improvement of image stabilization performance. The present invention also provides an optical apparatus including the above described optical image stabilizer.

An optical image stabilizer according to one aspect of the present invention includes a first movable part that includes a first lens having one of positive and negative optical powers, a second movable part that includes a second lens having the other of the positive and negative optical powers, a supporting member that supports the first and second movable parts such that the first and second movable parts are movable in directions different from a direction of an optical axis, and an actuator that drives the first and second movable parts in the directions opposite to each other with respect to the supporting member. The actuator includes a first element that is provided on the supporting member, a second element that is provided on the first movable part and faces a first face of the first element, and a third element that is provided on the second movable part and faces a second face formed on an opposite side of the first element from the first face. The first element is one of a magnet and a coil, and the second element and the third element are the other of the magnet and the coil.

An optical image stabilizer according to another aspect of the present invention includes a first movable part including a first lens having one of positive and negative optical powers, a second movable part including a second lens having the other of the positive and negative optical powers, a supporting member that supports the first and second movable parts such that the first and second movable parts are movable in directions different from a direction of an optical axis, and an actuator that drives the first and second movable parts in directions opposite to each other with respect to the supporting member. The actuator includes a magnet that is provided on one of the first and second movable parts, and a coil that is provided on the other of the first and second movable parts.

An optical apparatus according to still another aspect of the present invention includes one of the above optical image stabilizers.

Other aspects of the present invention will become apparent from the following description and the attached drawings.

BEST MODE FOR CARRYING OUT THE INVENTION

Exemplary embodiments of the present invention will hereinafter be described with reference to the accompanying drawings.

Embodiment 1

Figure 18:
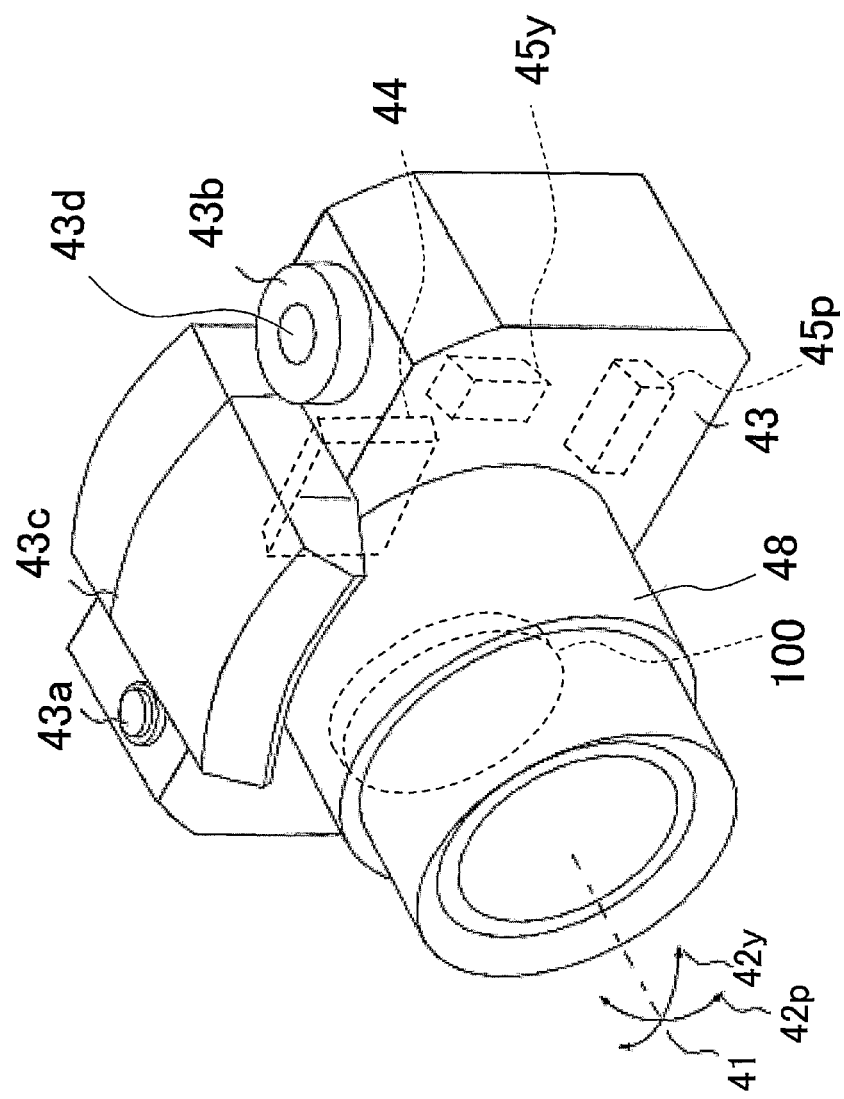
FIG. 18 is an external view of a digital camera including the optical image stabilizer of each of Embodiment 1 and Embodiments 3 to 6.

First, FIG. 18 shows an external view of a digital camera as an optical apparatus (image-pickup apparatus) including an optical image stabilizer that is a first embodiment (Embodiment 1) of the present invention. Although this embodiment will describe the digital camera integrated with a lens, the optical image stabilizer of this embodiment (and Embodiments 3 to 6 which will be described later) also can be provided in other image-pickup apparatuses such as an interchangeable lens and a video camera.

Reference numeral 43 denotes a camera body and reference numeral 43a denotes a release button to start an image-pickup operation. Reference numeral 43b denotes a mode dial to set an image-pickup mode. The mode dial 43b has a main switch 43d at the center thereof. Reference numeral 43c denotes a retractable flash. Reference numeral 48 denotes a lens barrel provided at the front part of the camera body 43. The lens tube 48 includes therein an image-pickup optical system. The image-pickup optical system causes a light flux from an object to form an object image on an image-pickup element, which will be described later. Reference numeral 41 denotes an optical axis of the image-pickup optical system.

A liquid crystal monitor (not shown) is provided on a back face of the camera body 43. The liquid crystal monitor displays an object image captured with the image-pickup element.

Reference numeral 100 denotes the optical image stabilizer provided in the lens barrel 48. Reference numerals 45$p$ and 45$y$ denote two shake sensors provided in the camera body 43. Reference numeral 44 denotes the image-pickup element provided in the camera body 43, which is a CCD sensor or a CMOS sensor for example. The shake sensors 45$p$ and 45$y$ are constituted by a vibrating gyroscope, for example. The shake sensor 45$p$ detects a shake in a vertical direction (hereinafter referred to as a pitch direction) shown by an arrow 42$p$, and the shake sensor 45$y$ detects a shake in a horizontal direction (hereinafter referred to as a yaw direction) shown by an arrow 42$y$.

The shake sensors 45$p$ and 45$y$ output signals in accordance with the shakes. The shake signals are input to driving circuits (see FIGS. 3 and 6), which will be described later. The driving circuits control energization to the optical image stabilizer based on the shake signals. The optical image stabilizer performs an image stabilization operation to suppress an image shake on the image-pickup element 44 due to hand jiggling or the like.

Figure 1:
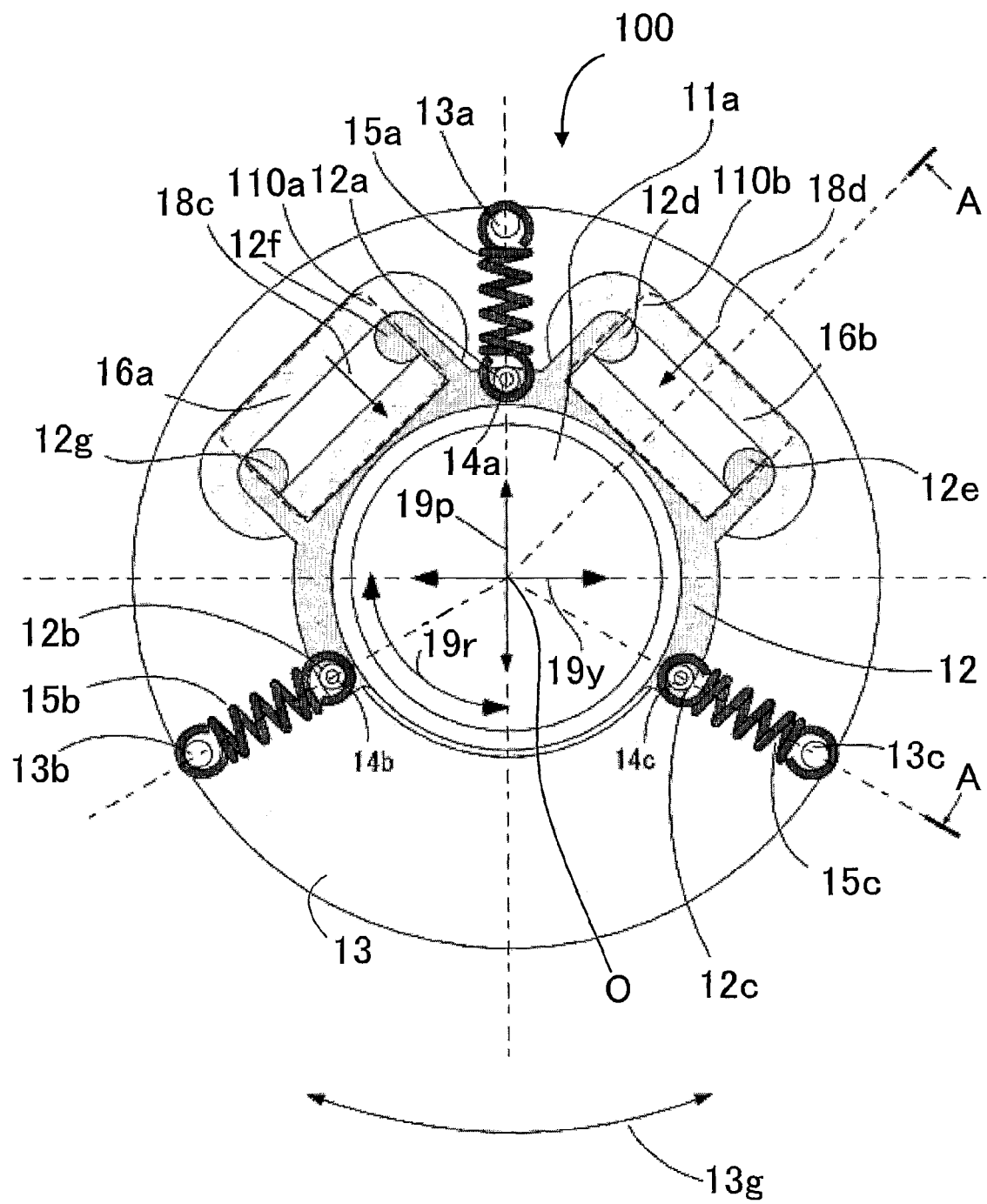
FIG. 1 is a front view showing the optical image stabilizer that is a first embodiment (Embodiment 1) of the present invention.
Figure 2:
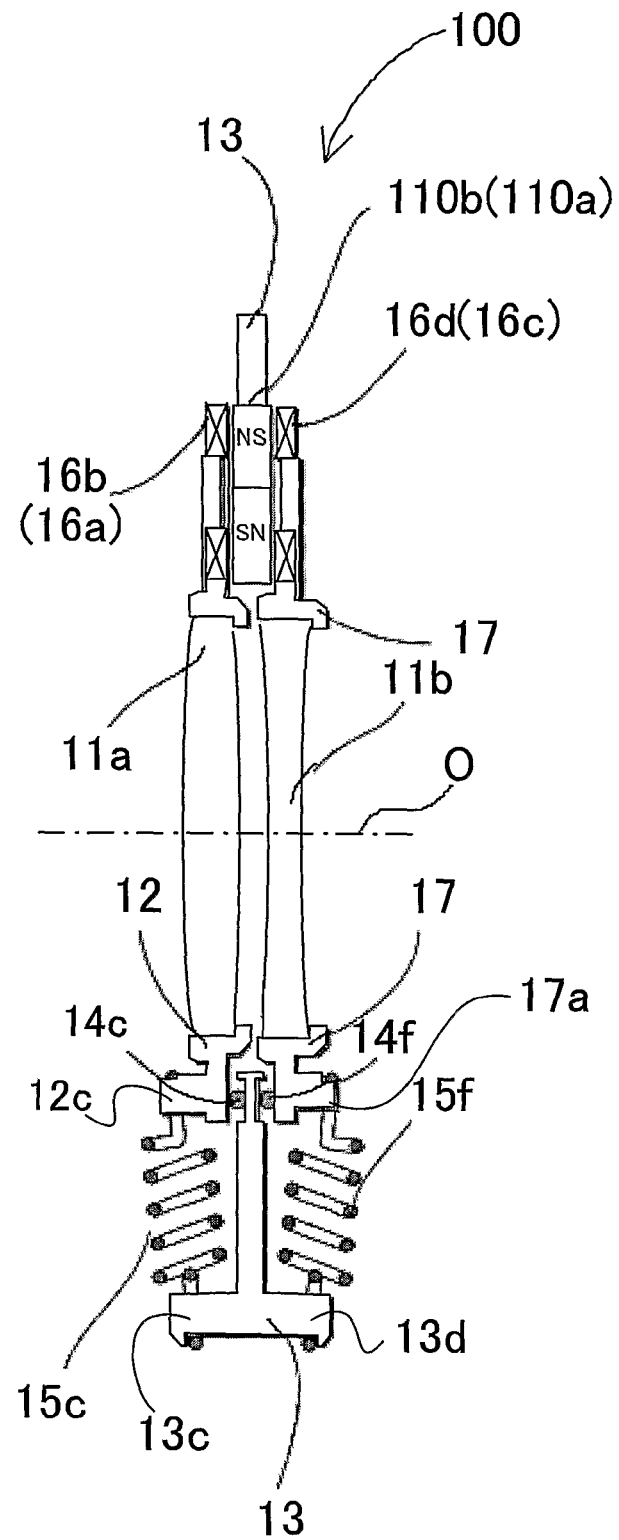
FIG. 2 is a cross-sectional view showing the optical image stabilizer of Embodiment 1.

FIG. 1 is a front view showing the optical image stabilizer 100. FIG. 2 is a cross-sectional view of the optical image stabilizer taken along the line A-A in FIG. 1.

In these figures, reference numeral 11a denotes a positive correction lens having a positive optical power. The optical power can also be said as an inverse of a focal length, or as a refractive power. Reference numeral 12 denotes a holding frame that holds the positive correction lens 11a. Reference numeral 11b denotes a negative correction lens that has a negative optical power which is an optical power opposite to the positive optical power. Reference numeral 17 denotes a holding frame that holds the negative correction lens 11b.

In this embodiment, the positive correction lens 11a corresponds to a first lens and the negative correction lens 11b corresponds to a second lens. The positive correction lens 11a and the holding frame 12 correspond to a first movable part. The negative correction lens 11b and the holding frame 17 correspond to a second movable part.

Reference numeral 13 denotes a base plate that is a supporting member holding the holding frames 12 and 17 in directions different from optical axes O of the respective correction lenses (directions orthogonal to the optical axes O in this embodiment).

A front face of the holding frame 12 is provided with pins 12a, 12b, and 12c arranged to have an interval of 120 degrees thereamong in its circumference direction. A front face of the base plate 13 is provided with pins 13a, 13b, and 13c arranged to have an interval of 120 degrees thereamong in its circumference direction. The "front" in this embodiment corresponds to an object side, which is the left side in FIG. 2.

Both ends of tension coil springs 15a, 15b, and 15c are respectively hooked on the pins 12a to 12c and the pins 13a to 13c. The tension coil springs 15a, 15b, and 15c are a first elastic member that elastically supports the holding frame 12 in the direction orthogonal to the optical axis O.

At three positions in the circumference direction between the back face of the holding frame 12 and the front face of the base plate 13, balls 14a, 14b, and 14c are disposed in a rotatable manner.

As shown in FIG. 2, each of the tension coil springs 15a to 15c is obliquely hooked on the pins (12a to 12c and 13a to 13c) such that its inner end (holding frame side end) is further away from the base plate 13 to the front side in the optical axis direction than its outer end (base plate side end). Thus, the holding frame 12 is biased to a rear side in the optical axis direction with respect to the base plate 13. The holding frame 12 and the base plate 13 sandwich the balls 14a to 14c. Thus, the holding frame 12 is guided by the balls 14a to 14c in the pitch direction shown by an arrow 19p and the yaw direction shown by an arrow 19y in FIG. 1 with respect to the base plate 13. In other words, the holding frame 12 is prevented from being moved in the optical axis direction by the base plate 13 and the balls 14a to 14c.

The tension forces of the respective tension coil springs 15a to 15c are appropriately set such that the rotation around the optical axis shown by an arrow 19r of the holding frame 12 pulled by the springs 15a to 15c in its radial direction is prevented.

Since the tension forces of the tension coil springs 15a to 15c in the pitch direction 19p and in the yaw direction 19y are canceled each other out, the holding frame 12 can be moved with a relatively small force.

On the other hand, a back face of the holding frame 17 is provided with three pins 17a arranged in its circumference direction with an interval of 120 degrees thereamong. Only one of the three pins 17a is shown in FIG. 2. A back face of the base plate 13 is also provided with three pins 13d arranged in its circumference direction with an interval of 120 degrees thereamong. Only one of the three pins 13d is shown in FIG. 2.

Both ends of tension coil springs 15f are respectively hooked on the pins 17a of the holding frame 17 and the pins 13d of the base plate 13. Only one of the tension coil springs 15f is shown in FIG. 2. The tension coil springs 15f are a second elastic member that elastically supports the holding frame 17 in the direction orthogonal to the optical axis O.

At three positions in the circumference direction between the front face of the holding frame 17 and the back face of the base plate 13, three balls 14f are rotatably disposed. Only one of the three balls 14f is shown in FIG. 2.

Each of the tension coil spring 15f is obliquely hooked on the pins 17a and 13d such that its inner end (holding frame side end) is further away from the base plate 13 to the rear side in the optical axis direction than its outer end (base plate side end). Thus, the holding frame 17 is biased to the front side in the optical axis direction with respect to the base plate 13, and the holding frame 17 and the base plate 13 sandwich the three balls 14f. The holding frame 17 is guided by the balls 14f in the pitch direction and the yaw direction with respect to the base plate 13. In other words, the holding frame 17 is prevented from being moved in the optical axis direction by the base plate 13 and the balls 14f.

The tension forces of the respective tension coil springs 15f are appropriately set such that the rotation around the optical axis of the holding frame 17 pulled by the springs 15f in its radial direction is prevented. Since the tensions of the three tension coil springs 15f are canceled each other out in the pitch direction and the yaw direction, the holding frame 17 can be moved with a relatively small force.

The configuration described above can be restated as follows. The first movable part constituted by the positive correction lens 11a and the holding frame 12 and the second movable part constituted by the negative correction lens 11b and the holding frame 17 are arranged so as to sandwich the base plate 13 in the optical axis direction. In other words, the first and second movable parts are arranged at both sides of the base plate 13. These movable parts can be moved in the pitch and yaw directions with respect to the base plate 13 and are prevented (or limited) from being moved in the optical axis direction by the base plate 13 and the balls 14a to 14c and 14f.

Coils 16a and 16b (second elements) are respectively attached on protrusions 12f and 12g and protrusions 12d and 12e formed on the holding frame 12 by adhesion. The coils 16a and 16b are attached at positions having different phases by 90 degrees when viewed from the optical axis. Permanent magnets 110a and 110b (first elements, hereinafter simply referred to as magnets) formed of neodymium, for example, are attached on the base plate 13 by adhesion. The magnets 110a and 110b are also attached at positions having different phases by 90 degrees when viewed from the optical axis. The coils 16a and 16b respectively face front faces (first faces) of the magnets 110a and 110b with a predetermined gap therebetween.

On the other hand, two coils 16c and 16d (third elements) are attached on protrusions (not shown) formed on the holding frame 17 by adhesion. However, the coil 16c is not shown. The coils 16c and 16d are also attached at positions that have different phases by 90 degrees when viewed from the optical axis, and that have the same phases as those of the coils 16a and 16b and the magnets 110a and 110b. These two coils 16c and 16d respectively face back faces of the magnets 110a and 110b (second faces on the side opposite from the first faces) with a predetermined gap therebetween.

As shown in FIG. 2, each of the magnets 110a and 110b has two magnetized areas each including an N pole and an S pole formed in its thickness direction, the two magnetized areas being provided at the outer side and the inner side in the radial direction. The outer magnetized area is magnetized such that the front face has the N pole and the back face has the S pole. The inner magnetized area is magnetized such that the front face has the S pole and the back face has the N pole. Thus, a magnetic flux passes through the coils 16a and 16b provided on the first movable part side and the coils 16c and 16d provided on the second movable part side in a direction vertical to the paper of FIG. 1.

Although not shown in FIGS. 1 and 2, a yoke provide on the opposite side of the coils 16a, 16b, 16c, and 16d from the magnets 110a and 110b rectifies the magnetic flux to the coils 16a to 16d to improve driving efficiency.

In the configuration described above, when an electric current is applied to the coil 16a in a predetermined direction, the holding frame 12 is driven in a direction shown by an arrow 18c. When an electric current is applied thereto in a direction opposite to the predetermined direction, the holding frame 12 is driven in a direction opposite to that shown by the arrow 18c. When an electric current is applied to the coil 16b in a predetermined direction, the holding frame 12 is driven in a direction shown by an arrow 18d. When an electric current is applied thereto in a direction opposite to the predetermined direction, the holding frame 12 is driven in a direction opposite to that shown by the arrow 18d. In this manner, the first movable part is two-dimensionally driven to be decentered in a plane orthogonal to the optical axis O of the positive correction lens 11a.

The driving amount thereof is determined based on the balance between the spring constants of the tension coil springs 15a, 15b, and 15c in the respective driving directions and thrust forces generated by the coils 16a and 16b and the magnets 110a and 110b. Specifically, the decentering amount of the positive correction lens 11a can be controlled based on the amounts of the electric currents applied to the coils 16a and 16b.

Similarly, the holding frame 17 is driven in the directions shown in the arrows 18c and 18d and the direction opposite thereto in accordance with the directions of electric currents applied to the coils 16c and 16d. In this manner, the second movable part is two-dimensionally driven to be decentered in a plane orthogonal to the optical axis O of the negative correction lens 11b. The decentering amount of the negative correction lens 11b can be controlled based on the amount of the electric currents applied to the coils 16c and 16d. In this embodiment, the application of the electric currents to the coils 16c and 16d in direction opposite to that to the coils 16a and 16b drives the first and second movable parts in directions opposite to each other.

The coil 16a and the magnet 110a constitute an actuator that drives the first movable part in the direction shown by the arrow 18c and the direction opposite thereto. The coil 16b and the magnet 110b constitute an actuator that drives the first movable part in the direction shown by the arrow 18d and the direction opposite thereto. The coil 16c and the magnet 110a constitute an actuator that drives the second movable part in the direction shown by the arrow 18c and the direction opposite thereto. The coil 16d and the magnet 110b constitute an actuator that drives the second movable part in the direction shown by the arrow 18d and the direction opposite thereto.

Specifically, in this embodiment, the actuator that drives the first movable part and the actuator that drives the second movable part commonly use the magnets 110a and 110b. In other words, the use of the one common magnet for the two coils configures one compact actuator that drives the first and second movable parts in a specific direction and in a direction opposite thereto. This can reduce the size of the entire image stabilizer.

Although the respective magnets are provided as an integrally-formed element in this embodiment, another configuration also may be employed where a magnet facing the first movable part side coil and a magnet facing the second movable part side coil are separately manufactured and a ferromagnetic plate or the like attracted by these magnets is disposed between the magnets. This is also applied to Embodiment 2 which will be described later.

Figure 3:
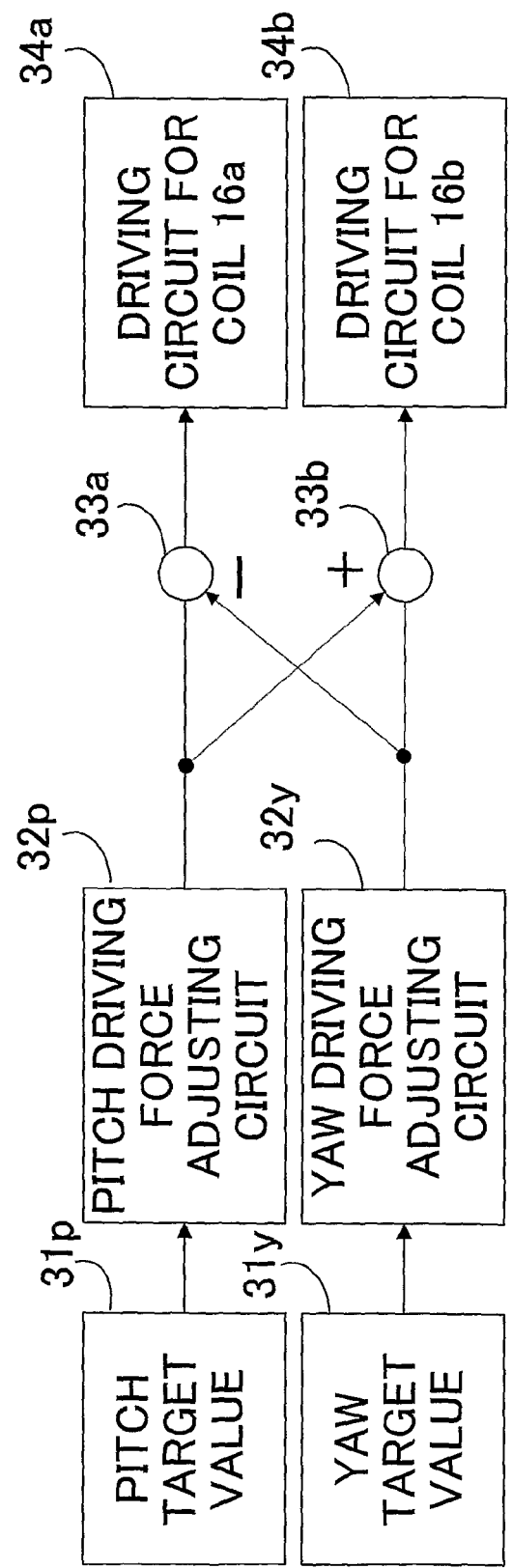
FIG. 3 is a block diagram showing part of a control circuit that controls a first movable part in the optical image stabilizer of Embodiment 1.

FIG. 3 shows the configuration of part of a control circuit that controls the energization to the coils 16a and 16b in order to drive the first movable part.

A pitch target value 31p and a yaw target value 31y are target values to drive the first movable part in the pitch direction 19p and in the yaw direction 19y, respectively. These target values are calculated by a known image stabilization target value calculating circuit disclosed in FIG. 30 in Japanese Patent Laid-Open No. 2-162320, for example.

The pitch target value 31p and the yaw target value 31y are gain-adjusted by a pitch driving force adjusting circuit 32p and a yaw driving force adjusting circuit 32y, respectively, in accordance with the driving force of the actuator.

The output of the pitch driving force adjusting circuit 32p is input to a driving circuit 34a for the coil 16a. The driving circuit 34a generates a PWM duty signal based on the output from the pitch driving force adjusting circuit 32p, and applies a pulse current to the coil 16a. The output from the pitch driving force adjusting circuit 32p is input to a driving circuit 34b for the coil 16b via an adder 33b. The driving circuit 34b generates a PWM duty signal based on the output from the pitch driving force adjusting circuit 32p, and applies a pulse current to the coil 16b. Thus, the electric currents having the same phase and the same amount are applied to the coils 16a and 16b in accordance with the pitch target value 31p, and thereby the first movable part is driven to a position corresponding to the pitch target value 31p in the pitch direction.

On the other hand, the output from the yaw driving force adjusting circuit 32y is input to the driving circuit 34b for the coil 16b. The driving circuit 34b generates a PWM duty signal based on the output from the yaw driving force adjusting circuit 32y, and applies a pulse current to the coil 16b. The output from the yaw driving force adjusting circuit 32y is also input to the driving circuit 34a for the coil 16a via an inverting circuit 33a. The driving circuit 34a generates a PWM duty signal based on the inverted output from the yaw driving force adjusting circuit 32y, and applies a pulse current to the coil 16a. Thus, the electric currents having the opposite phases and the same amount are applied to the coils 16a and 16b to drive the first movable part to a position corresponding to the yaw target value 31y in the yaw direction.

Figure 4:
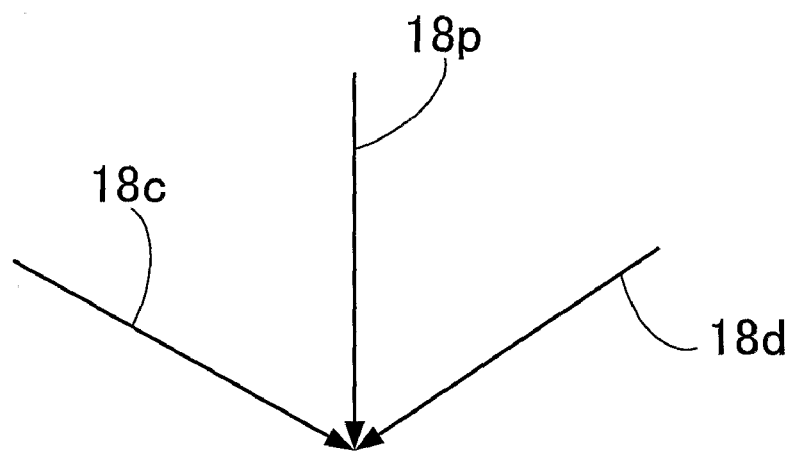
FIG. 4 shows the driving principle of a first movable part in a pitch direction in the optical image stabilizer of Embodiment 1.

Specifically, when the electric currents having the same phase and the same amount are applied to the coils 16a and 16b, the coil 16a generates the driving force in the direction shown by the arrow 18c as shown in FIG. 4, and the coil 16b generates the driving force in the direction shown by the arrow 18d. Thus, the resultant force of these driving forces is a driving force acting in the pitch direction 19p as shown by an arrow 18p. Since the two coils 16a and 16b are arranged to have difference phases by 90 degrees, the driving force as the resultant force is a driving force obtained by combining $1/\sqrt{2}$ of the driving forces generated by the respective coils 16a and 16b.

Figure 5:
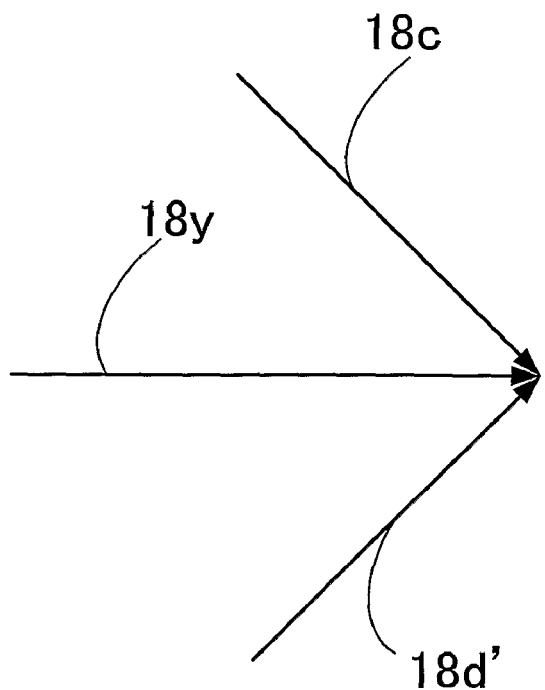
FIG. 5 shows the driving principle of a second movable part in a yaw direction in the optical image stabilizer of Embodiment 1.

On the other hand, when the electric currents having the opposite phases and the same amount are applied to the coils 16a and 16b, the coil 16a generates the driving force in the direction shown by the arrow 18c as shown in FIG. 5, and the coil 16b generates the driving force in a direction 18d' opposite to that shown by the arrow 18d. Thus, the resultant force of these driving forces is a driving force acting in the yaw direction 19y as shown by an arrow 18y. Since the two coils 16a and 16b are arranged to have different phases by 90 degrees, the driving force as the resultant force is a driving force obtained by combining $1/\sqrt{2}$ of the respective driving forces generated by the respective coils 16a and 16b.

The pitch driving force adjusting circuit 32p and the yaw driving force adjusting circuit 32y are provided in order to cause the decentering amounts of the correction lenses 11a and 11b constituting part of the image-pickup optical system to correspond to decentering sensitivity of the image-pickup optical system.

Figure 6:
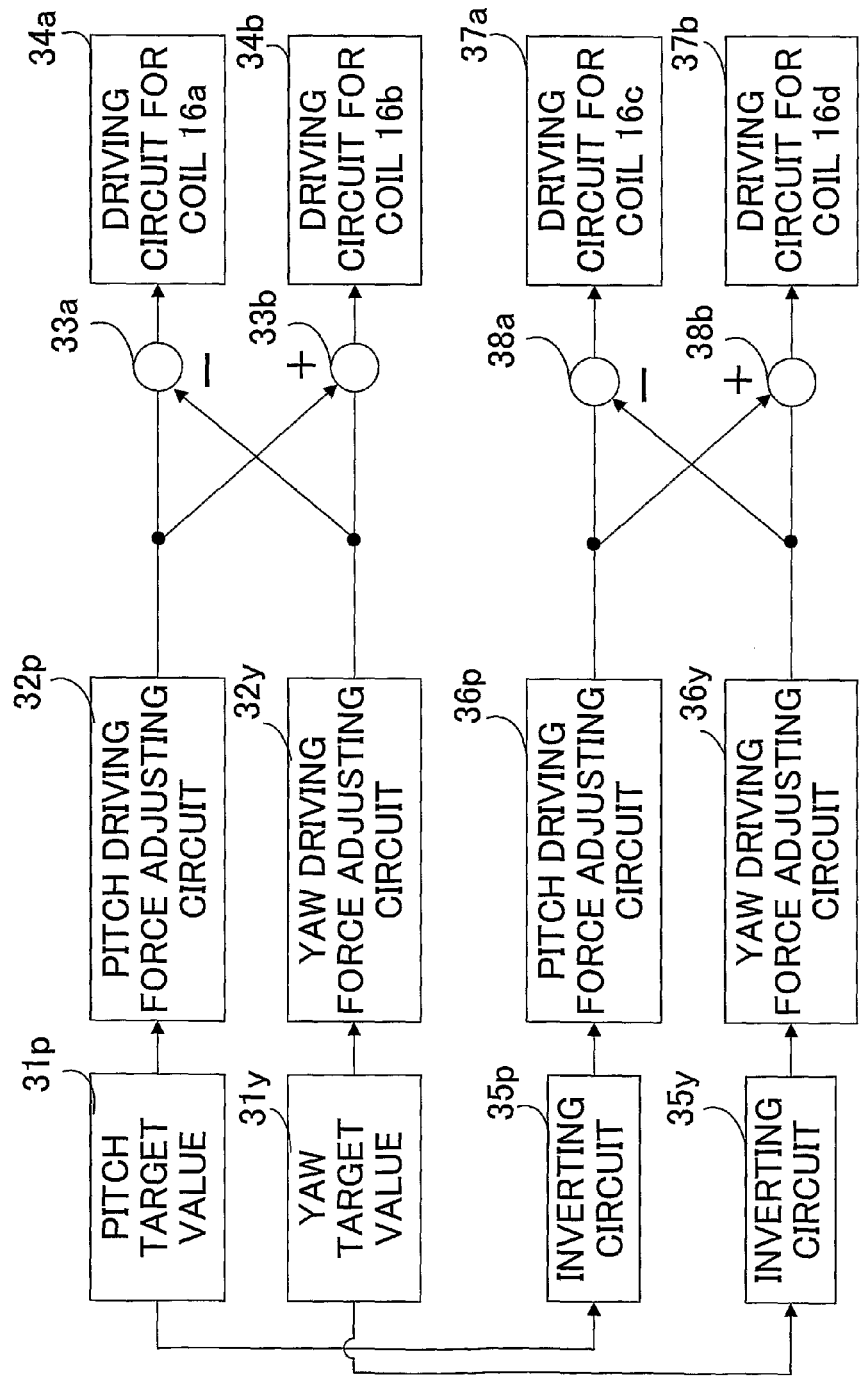
FIG. 6 is a block diagram showing part of the control circuit that controls the first and second movable part in the optical image stabilizer of Embodiment 1.

FIG. 6 shows a control circuit that controls the energization to the coils 16c and 16d in order to drive the second movable part, in addition to the control circuit shown in FIG. 3.

The direction of the pitch target value 31p is inverted by an inverting circuit 35p, and then the inverted pitch target value is input to a pitch driving force adjusting circuit 36p. The output gain-adjusted by the pitch driving force adjusting circuit 36p is input to a driving circuit 37a for the coil 16c. The driving circuit 37a generates a PWM duty signal based on the output from the pitch driving force adjusting circuit 36p, and applies a pulse current to the coil 16c. The output from the pitch driving force adjusting circuit 36p is input to a driving circuit 37b for the coil 16d via an adder 38b. The driving circuit 37b generates a PWM duty signal based on the output from the pitch driving force adjusting circuit 36p, and applies a pulse current to the coil 16d. Thus, the electric currents having the same phase and the same amount are applied to the coils 16c and 16d in accordance with the inverted value of the pitch target value 31p, and the second movable part is driven to a position corresponding to the inverted value of the pitch target value 31p in the pitch direction.

On the other hand, the direction of the yaw target value 31y is inverted by an inverting circuit 35y, and then the inverted yaw target value is input to a yaw driving force adjusting circuit 36y. The output gain-adjusted by the yaw driving force adjusting circuit 36y is input to the driving circuit 37b for the coil 16d. The driving circuit 37b generates a PWM duty signal based on the output from the yaw driving force adjusting circuit 36y, and applies a pulse current to the coil 16d. The output from the yaw driving force adjusting circuit 36y is also input to the driving circuit 37a for the coil 16c via an inverting circuit 38a.

The driving circuit 37a generates a PWM duty signal based on the inverted output from the yaw driving force adjusting circuit 36y, and applies a pulse current to the coil 16c. Thus, the electric currents having the opposite phases and the same amount are applied to the coils 16c and 16d in accordance with the inverted value of the yaw target value 31y, and the second movable part is driven to a position corresponding to the inverted value of the yaw target value 31y in the yaw direction.

The principle of generating the driving force in the pitch and yaw directions when the electric currents having the same phase or the opposite phases and the same amount are applied to the coils 16c and 16d is the same as that described with reference to FIGS. 4 and 5.

As described above, the first and second movable parts (that is, the positive correction lens 11a and the negative correction lens 11b) are driven in opposite directions with respect to the pitch target value 31p and the yaw target value 31y.

Figure 7:
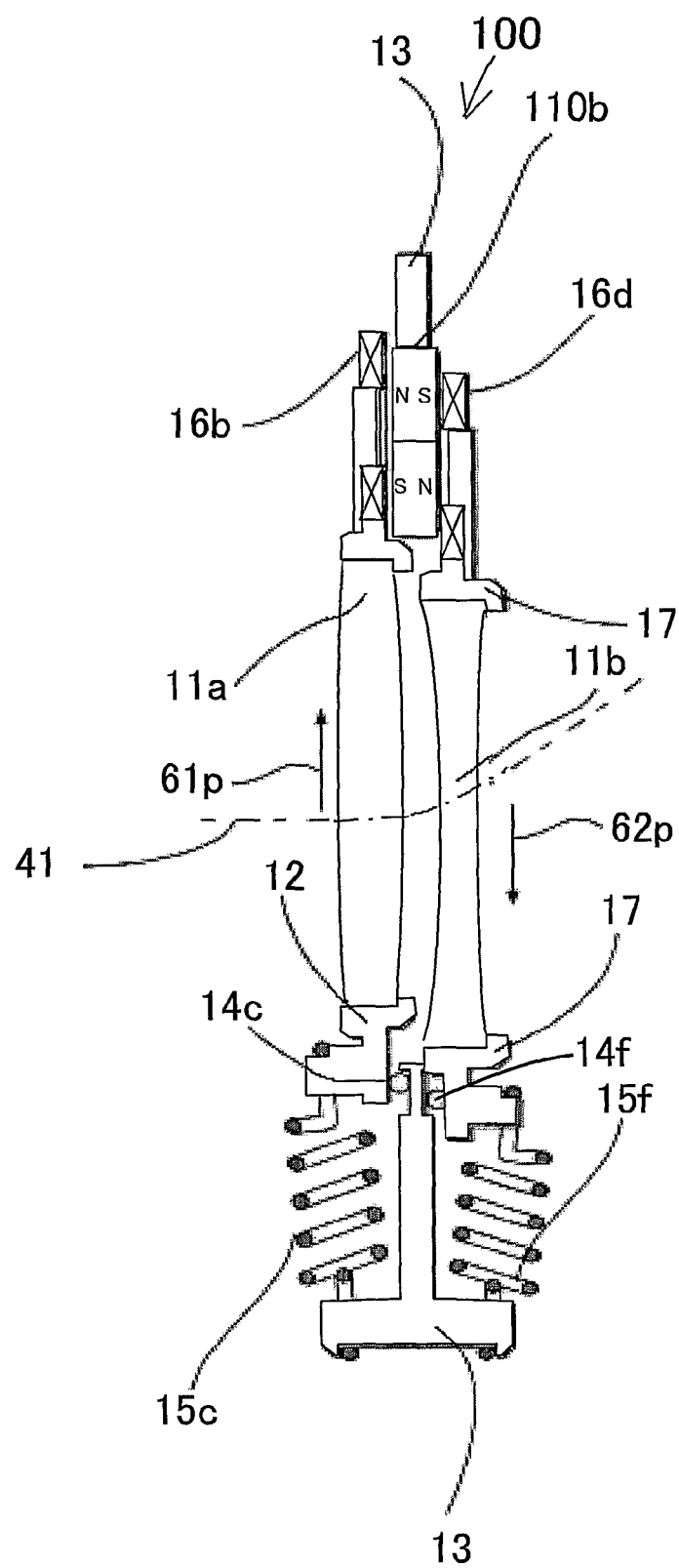
FIG. 7 is a cross-sectional view showing the optical image stabilizer of Embodiment 1 in an image stabilization operation state.

FIG. 7 shows the positive correction lens 11a driven in an upper direction 61p in the figure and the negative correction lens 11b driven in a lower direction 62p in the figure. The movement of the positive correction lens 11a and the negative correction lens 11b in the opposite directions significantly deviates (decenters) the optical axis 41 of the image-pickup optical system. Thereby, an image-stabilization effective shake amount, that is, a shake amount to which the image stabilization is effective can be increased compared with the driving stroke of each correction lens.

By the way, the first and second movable parts are displaced in the gravity direction due to deformations of the tension coil springs 15a to 15c and the three tension coil springs 15f by their own weights.

Here, a structure constituted by the first movable part including the positive correction lens 11a and the holding frame 12, and the tension coil springs 15a to 15c is called as a first movable mechanism. Another structure constituted by the second movable part including the negative correction lens 11b and the holding frame 17, and the three tension coil springs 15f is called as a second movable mechanism.

In this case, the first movable mechanism and the second movable mechanism may have a natural frequency set so as to satisfy the following condition (1). The natural frequency NF1 of the first movable mechanism is determined mainly based on the mass of the first movable part and the combined spring constant of the tension coil springs 15a to 15c. Similarly, the natural frequency NF2 of the second movable mechanism is determined mainly based on the mass of the second movable part and the combined spring constant of the tension coil spring 15f.

$$0.7 \leq NF1/NF2 \leq 1.4 \qquad (1)$$

When this condition (1) is satisfied, even when both of the correction lenses 11a and 11b are displaced to some extent in the gravity direction, an effect is obtained to cancel the decentering of the optical axis due to the displacements of the correction lenses 11a and 11b. Consequently, substantially no focal shift is caused on the image-pickup element 44. Furthermore, both of the correction lenses 11a and 11b can have well-balanced driving strokes, and the positions of the correction lenses 11a and 11b can be controlled easily.

When the natural frequency ratio (NF1/NF2) is 1.4, a permissible displacement of the first correction lens 11a due to its own weight may be about two times higher than that of the second correction lens 11b.

The natural frequency has a relation with a deformation amount of the spring hanging a lens caused by the gravity. When the natural frequencies of the first and second movable mechanisms are equal to each other, since the deformation amounts of the springs in the first and second movable mechanism are equal to each other (since the optical powers of the correction lenses in these movable mechanisms are reverse to each other in positive and negative), the decentering of the optical axis is canceled. Thus, compared with the conventional design having a single movable mechanism where the deformation of the spring due to the gravity has a direct influence on the decentering of the optical axis, the optical performance of this embodiment is remarkably improved.

When the natural frequencies are not equal to each other and are different from each other by 1.4 times, the deformation amounts of the springs in the first and second movable mechanisms due to the gravity have a difference therebetween corresponding to the square of the difference between the natural frequencies.

When the displacement amount of the first movable part due to its own weight is 0.2 mm in the gravity direction, the displacement amount of the second movable part due to its own weight is 0.1 mm in the same direction. When the holding frame 12 is moved by 1 mm in the non-image stabilizing operation state, the holding frame 17 is moved by 0.5 mm in the direction opposite thereto.

Compared with the conventional spring-hanging-type image stabilizer that drives a single lens, the decentering amount of the optical axis of the image-pickup optical system associated with the displacement of the movable part due to its own weight can be suppressed to 0.5 times in this embodiment. Furthermore, the image-stabilization effective shake amount in the image stabilizing operation state can be increased by 1.5 times.

Figure 8:
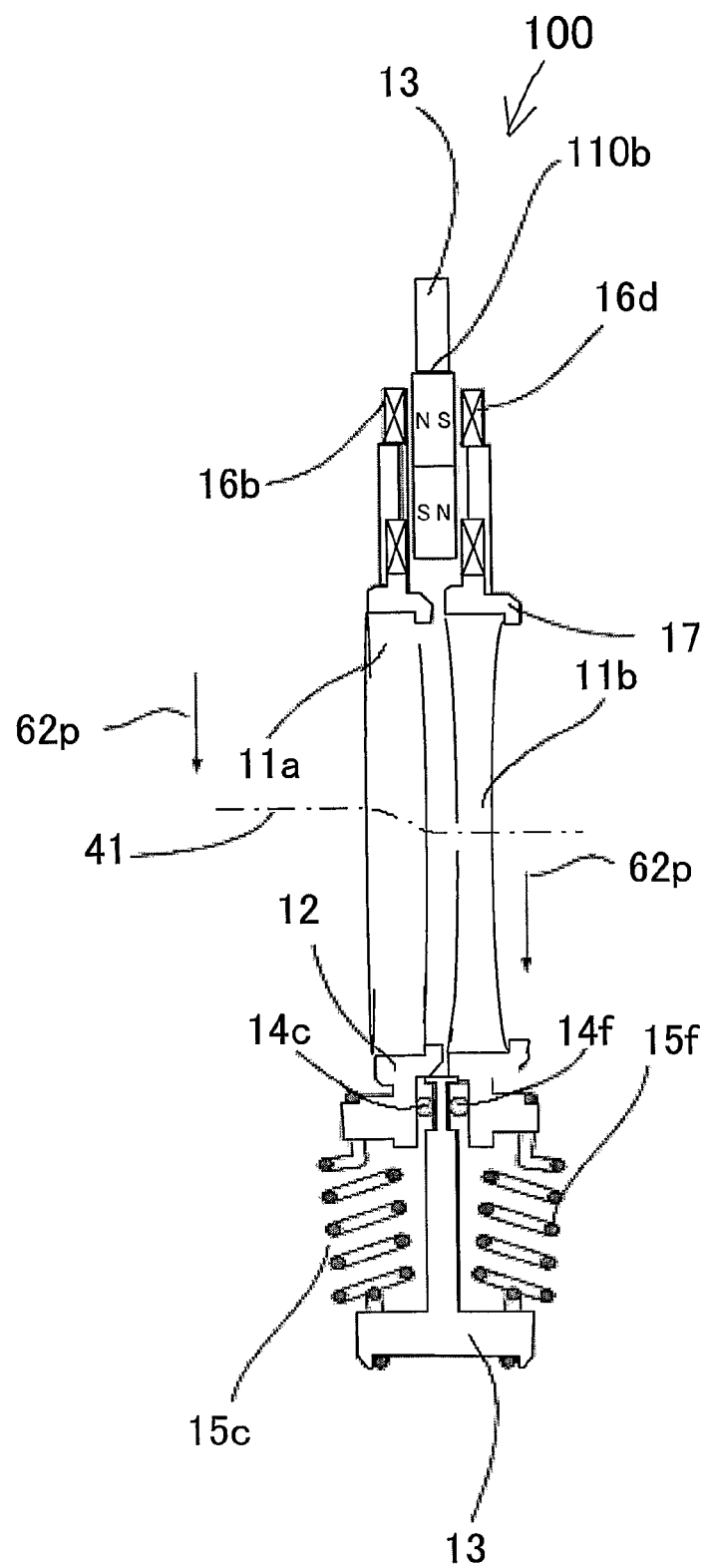
FIG. 8 is a cross-sectional view showing the optical image stabilizer of Embodiment 1 in which the movable part is displaced due to its own weight.

FIG. 8 shows a state where the first and second movable parts are displaced due to their own weights. Although the positive correction lens 11a displaced in the lower direction 62p in the figure changes the optical axis 41 of the image-pickup optical system in an obliquely-downward direction, the negative correction lens 11b displaced in the same lower direction 62p returns the optical axis 41 so as to extend in a direction parallel to the original optical axis direction. Thus, although the position of the optical axis 41 on the image-pickup element 44 is slightly shifted, the focus state on the image-pickup element 44 is not substantially changed because the shift direction of the optical axis 41 is not changed.

In this manner, the driving of the correction lenses 11a and 11b having the opposite optical powers in positive and negative in the directions opposite to each other can improve the deflecting effect of the optical axis 41 of the image-pickup optical system. Thus, even when the respective correction lenses 11a and 11b have small driving strokes, a sufficient image-stabilization effective shake amount can be secured. Furthermore, the focal shift associated with the displacements of the correction lenses 11a and 11b due to their own weights can be reduced. Therefore, the focal shift due to changes in posture of the camera also can be suppressed.

Moreover, dividing the correction lens into two can allow the respective correction lenses to have a lighter weight. Thus, the division of the correction lenses in addition to the above-described reduction of the driving strokes can reduce power consumption of the optical image stabilizer.

Furthermore, the common use of the magnet for driving the respective first and second movable parts as described above can provide the actuator with a compact configuration. Thus, miniaturization of the optical image stabilizer can be achieved. Moreover, the actuator constituted by the magnet and the coil can provide the driving of the correction lenses 11a and 11b with high speed and good positional accuracy, thus improving image stabilization performance of the optical image stabilizer.

Although this embodiment has described a case where the positive correction lens is provided at the front side and the negative correction lens is provided at the rear side, another configuration may be used where the negative correction lens is provided at the front side and the positive correction lens is provided at the rear side. This also applies to other embodiments described later.

Although this embodiment has described a moving coil-type optical image stabilizer in which the base plate holds a magnet and the movable part holds a coil, another moving magnet-type optical image stabilizer is also included in embodiments of the present invention where the base plate holds a coil and the movable part holds a magnet. Specifically, in the actuator, the first element provided on the base plate may be one of a magnet and a coil and the second and third elements respectively provided in the first and second movable parts may be the other of the magnet and the coil. In the case of the moving magnet-type optical image stabilizer, a common coil may be used for the magnet in the first movable part and the magnet in the second movable part. Moreover, appropriately-selected spring constants of the springs hanging the respective movable parts also can control the driving amounts of the first and second movable parts, respectively. This also applies to Embodiments 2 and 5 described later.

Embodiment 2

Embodiment 1 has described the optical image stabilizer provided in the image-pickup apparatus. However, an optical image stabilizer of the present invention also can be applied to an observation apparatus (optical apparatus) such as binoculars or a telescope. An example of the binoculars including the optical image stabilizer will be described.

Binoculars are generally constituted by objective lenses, prism optical systems, and ocular lenses. FIGS. 9 to 13 show Binoculars in which the optical image stabilizers having the same configuration and function as those of Embodiment 1 are provided between the objective lenses and the prism optical systems.

It is noted that components in this embodiment identical to or having the same functions as those in Embodiment 1 are denoted with the same reference numerals as those in Embodiment 1.

Figure 9:
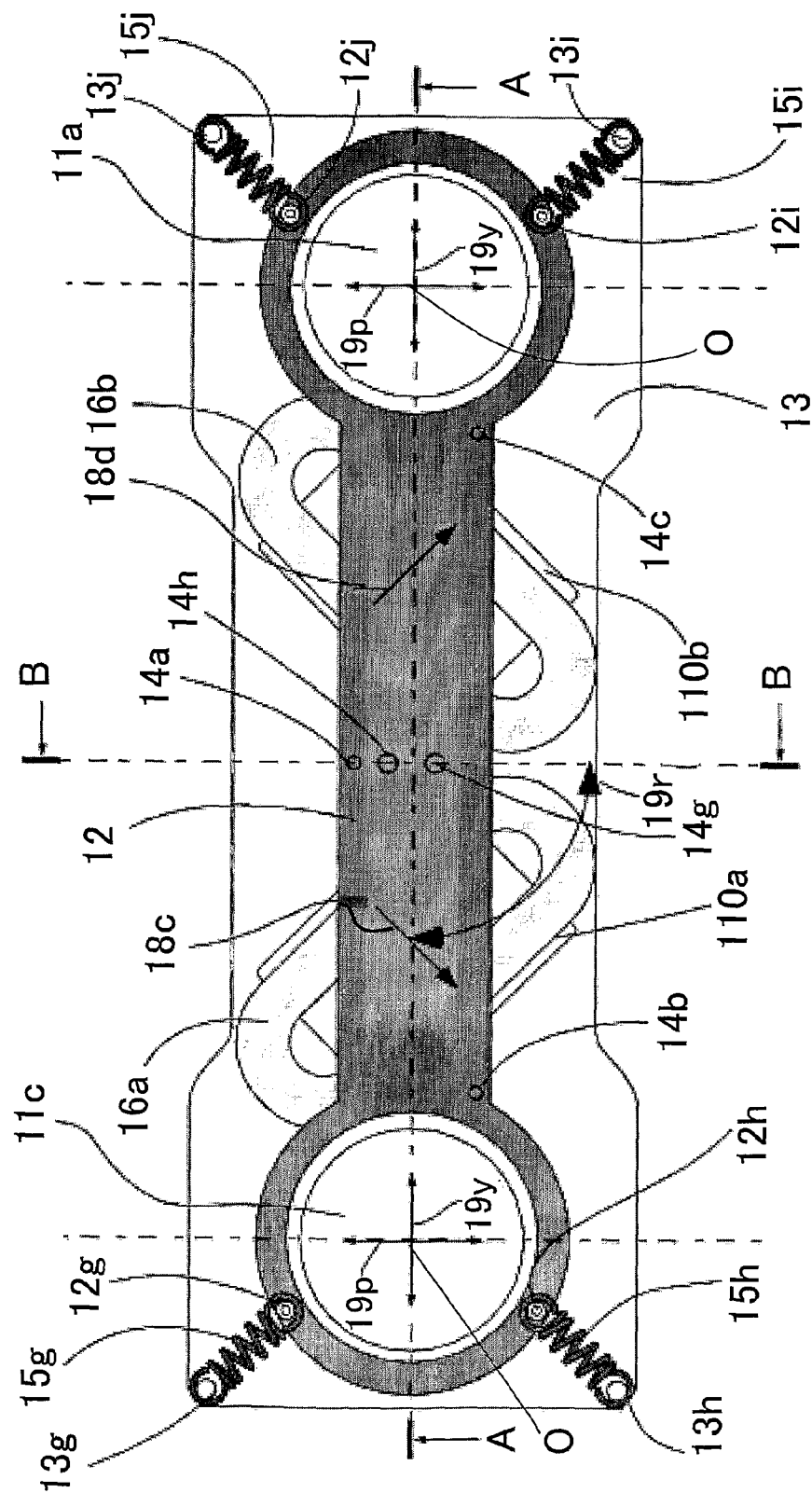
FIG. 9 is a front view showing an optical image stabilizer that is a second embodiment (Embodiment 2) of the present invention.
Figure 10:
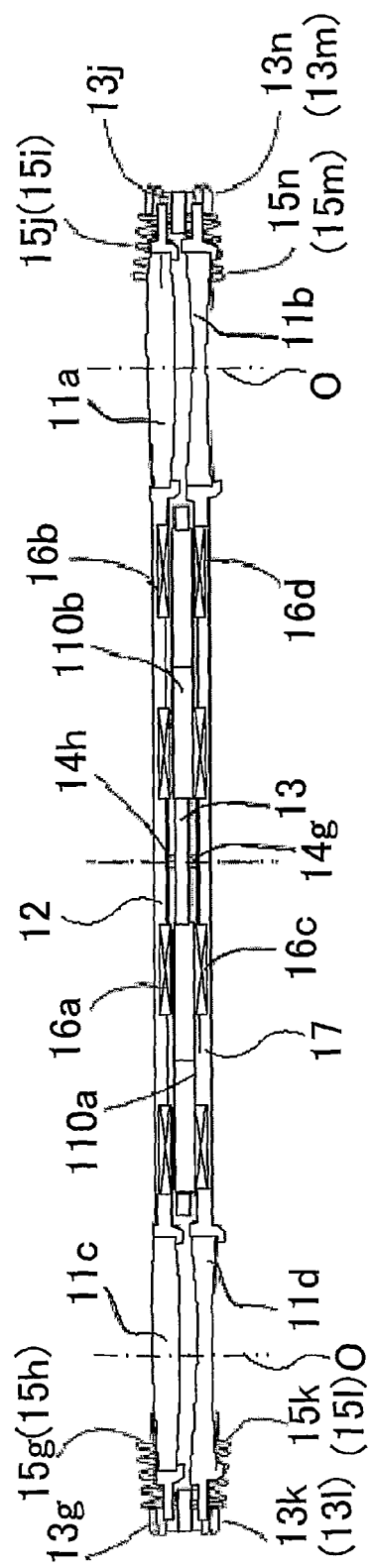
FIG. 10 is a lower cross-sectional view showing the optical image stabilizer of Embodiment 2.
Figure 11:
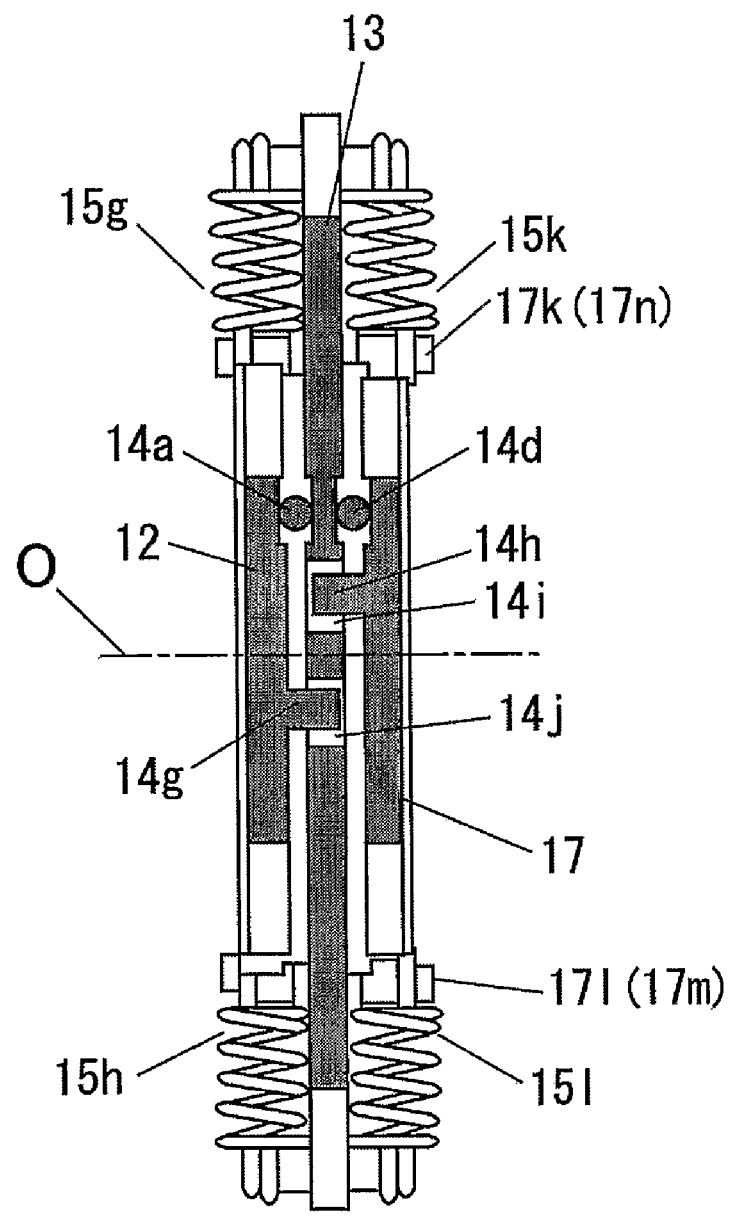
FIG. 11 is a transverse cross-sectional view showing the optical image stabilizer of Embodiment 2.

FIG. 9 is a front view showing the optical image stabilizer of this embodiment when viewed from the front side (objective lens side). FIG. 10 is a cross-sectional view taken along the line A-A of FIG. 9. FIG. 11 is a cross-sectional view taken along the line B-B of FIG. 9.

In FIGS. 9 to 11, reference numerals 11a and 11c denote left and right positive correction lenses (first lenses) provided at the front side. Reference numerals 11b and 11d denote left and right negative correction lenses (second lenses) provided at the rear side (prism optical system side). Reference numeral 12 denotes a holding frame that holds the left and right positive correction lenses 11a and 11b. Reference numeral 17 denotes a holding frame that holds the left and right negative correction lenses 11c and 11d. Reference numeral 13 denotes a base plate provided between the holding frames 12 and 17.

Four corners of a front face of the holding frame 12 have pins 12g, 12h, 12i, and 12j. Four corners of a front face of the base plate 13 also have pins 13g, 13h, 13i, and 13j.

Both ends of tension coil springs 15g, 15h, 15i, and 15j are hooked on each of the pins 12g to 12j and each of the pins 13g to 13j. Each of the tension coil springs 15g, 15h, 15i, and 15j is a first elastic member that elastically supports the holding frame 12 in a direction orthogonal to an optical axis O.

At three positions between a back face of the holding frame 12 and the front face of the base plate 3, balls 14a, 14b, and 14c are provided. It is noted that FIG. 9 shows the positions of the balls 14a to 14c which cannot be actually seen.

The back face of the holding frame 12 is provided with a damper shaft 14g penetrating the base plate 13. FIG. 9 shows the position of the damper shaft 14g which cannot be actually seen.

Each of the tension coil springs 15g to 15j is obliquely hooked as shown in FIG. 11 such that its inner end (holding frame side end) is further away from the base plate 13 than its outer end (base plate side end). Thus, the holding frame 12 is biased with respect to the base plate 13 to the rear side in the optical axis direction, and the holding frame 12 and the base plate 13 sandwich the balls 14a to 14c. Thereby, the holding frame 12 is guided by the balls 14a to 14c with respect to the base plate 13 in a pitch direction shown by an arrow 19p and a yaw direction shown by an arrow 19y. In other words, the holding frame 12 is prevented from being moved in the optical axis direction by the base plate 13 and the balls 14a to 14c.

Appropriately setting the tensions of the four tension coil springs 15g to 15j prevents the holding frame 12 pulled in its radial direction by these springs 15g to 15j from being rotated around the optical axis as shown by an arrow 19r.

The tensions of the tension coil springs 15g to 15j are canceled each other out in the pitch direction 19p and the yaw direction 19y. Thus, the holding frame 12 can be moved with a relatively small force.

On the other hand, pins 17k, 17l, 17m, and 17n are provided at the four corners of a back face of the holding frame 17. Pins 13k, 13l, 13m, and 13n are also provided at the four corners of a back face of the base plate 13.

Both ends of each of the tension coil springs 15k, 15l, 15m, and 15n are hooked on each of the pins 17k to 17n and each of the pins 13k to 13n. Each of the tension coil springs 15k, 15l, 15m, and 15n is a second elastic member that elastically supports the holding frame 17 in the direction orthogonal to the optical axis O.

At the three positions between the front face of the holding frame 17 and the back face of the base plate 13 (at the same positions as those of the balls 14a, 14b, and 14c in FIG. 9), three balls 14d are rotatably provided. Only one of the balls 14d is shown in FIG. 11.

The front face of the holding frame 17 is provided with a damper shaft 14h penetrating the base plate 13. FIG. 9 shows the position of the damper shaft 14h which cannot be actually seen. This position is different from the above-described position at which the damper shaft 14g is provided.

Each of the tension coil springs 15k to 15n is obliquely hooked such that its inner end (holding frame side end) is further away from the base plate 13 to the rear side than its outer end (base plate side end). Thus, the holding frame 17 is biased with respect to the base plate 13, and the holding frame 17 and the base plate 13 sandwich the three balls 14d. Therefore, the holding frame 17 is guided by the balls 14d with respect to the base plate 13 in the pitch direction and the yaw direction. In other words, the holding frame 12 is prevented from being moved in the optical axis direction by the base plate 13 and the balls 14d.

Appropriately setting the tensions of the four tension coil springs 15k to 15n prevents the holding frame 17 pulled in its radial direction by these springs 15k to 15n from being rotated around the optical axis. Since the tensions of the four tension coil springs 15k to 15n are canceled each other out in the pitch direction and in the yaw direction, the holding frame 17 can be moved with a relatively small force.

The configuration described above can be restated as follows. Specifically, the first movable part constituted by the positive correction lenses 11a and 11c and the holding frame 12 and the second movable part constituted by the negative correction lenses 11b and 11d and the holding frame 17 are provided at both sides of the base plate 13 in the optical axis direction so as to sandwich the base plate 13. These movable parts can be moved with respect to the base plate 13 in the pitch and yaw directions and can be prevented (or limited) from being moved in the optical axis direction by the base plate 13 and the balls 14a to 14d.

Coils 16a and 16b (second elements) are attached to the center portion in the back face of the holding frame 12 (the face facing the base plate 13) by adhesion. As shown in FIGS. 9 and 10, magnets 110a and 110b (first elements) such as neodymium are attached to the center portion in the front face of the base plate 13 by adhesion. The coils 16a and 16b face the front face (first face) of the magnets 110a and 110b with a predetermined gap therebetween.

On the other hand, coils 16c and 16d (third elements) are attached to the front face of the holding frame 17 by adhesion. These coils 16c and 16d are provided in FIG. 9 at the same positions as those of the coils 16a and 16b. The coils 16c and 16d face the back face of the magnets 110a and 110b (second face on a side opposite to the first face) with a predetermined gap therebetween.

As shown in FIG. 10, each of the magnets 110a and 110b has two magnetized areas each including an N pole and an S pole formed in its thickness direction, the two magnetized areas being provided at the outer side and the inner side in an oblique-left-and-right direction. As in Embodiment 1, the outer magnetized area is magnetized such that the front face has the N pole and the back face has the S pole. The inner magnetized area is magnetized such that the front face has the S pole and the back face has the N pole. Thereby, a magnetic flux penetrates the coils 16a and 16b provided on the first movable part side and the two coils 16c and 16d provided on the second movable part side in a direction vertical to the paper of FIG. 9.

Although not shown in FIGS. 9 and 10, a yoke provided on the opposite side of the coils 16a to 16d from the magnets 110a and 110b rectifies the magnetic flux to the coils 16a and 16b to improve driving efficiency.

In the configuration described above, when an electric current is applied to the coil 16a in a predetermined direction, the holding frame 12 is driven in a direction shown by an arrow 18c in FIG. 9. When an electric current is applied thereto in a direction opposite to the predetermined direction, the holding frame 12 is driven in a direction opposite to the direction shown by the arrow 18c. When an electric current is applied to the coil 16b in a predetermined direction, the holding frame 12 is driven in a direction shown by an arrow 18d. When an electric current is applied thereto in an opposite direction to the predetermined direction, the holding frame 12 is driven in a direction opposite to the direction shown by the arrow 18d.

In this manner, the first movable part is two-dimensionally driven to be decentered in a plane orthogonal to the optical axis O of the positive correction lenses 11a and 11c.

The driving amount thereof is determined based on the balance between the spring constants of the tension coil springs 15g to 15j in the respective driving directions and thrust forces generated by the coils 16a and 16b and the magnets 110a and 110b. Specifically, the decentering amount of the positive correction lenses 11a and 11c can be controlled based on the amount of the electric current applied to the coils 16a and 16b.

Similarly, the holding frame 17 is driven in the directions shown by the arrows 18c and 18d and the directions opposite thereto in accordance with the directions of electric currents applied to the coils 16c and 16d. In this manner, the second movable part is two-dimensionally driven to be decentered in a plane orthogonal to the optical axis O of the negative correction lenses 11b and 11d. The decentering amount of the negative correction lenses 11b and 11d can be controlled based on the amount of the electric currents applied to the coils 16c and 16d. In this embodiment, the application of the electric currents to the coils 16c and 16d in direction opposite to that to the coils 16a and 16b drives the first and second movable parts in directions opposite to each other. The principle of driving the holding frames 12 and 17 in a pitch direction 19p and a yaw direction 19y by applying the electric currents to the coils 16a to 16d is the same as that described in Embodiment 1 with reference to FIGS. 3 to 6.

Also in this embodiment, the coil 16a and the magnet 110a constitute an actuator that drives the first movable part in the direction shown by the arrow 18c and the direction opposite thereto. The coil 16b and the magnet 110b constitute an actuator that drives the first movable part in the direction shown by the arrow 18d and the direction opposite thereto.

Furthermore, the coil 16c and the magnet 110a constitute an actuator that drives the second movable part in the direction shown by the arrow 18c and the direction opposite thereto. The coil 16d and the magnet 110b constitute an actuator that drives the second movable part in the direction shown by the arrow 18d and the direction opposite thereto.

Specifically, in this embodiment, the actuator that drives the first movable part and the actuator that drives the second movable part commonly use the magnets 110a and 110b. In other words, the use of the one common magnet for the two coils configures one compact actuator that drives the first and second movable parts in a specific direction and in a direction opposite thereto. This can reduce the size of the entire image stabilizer.

Figure 12:
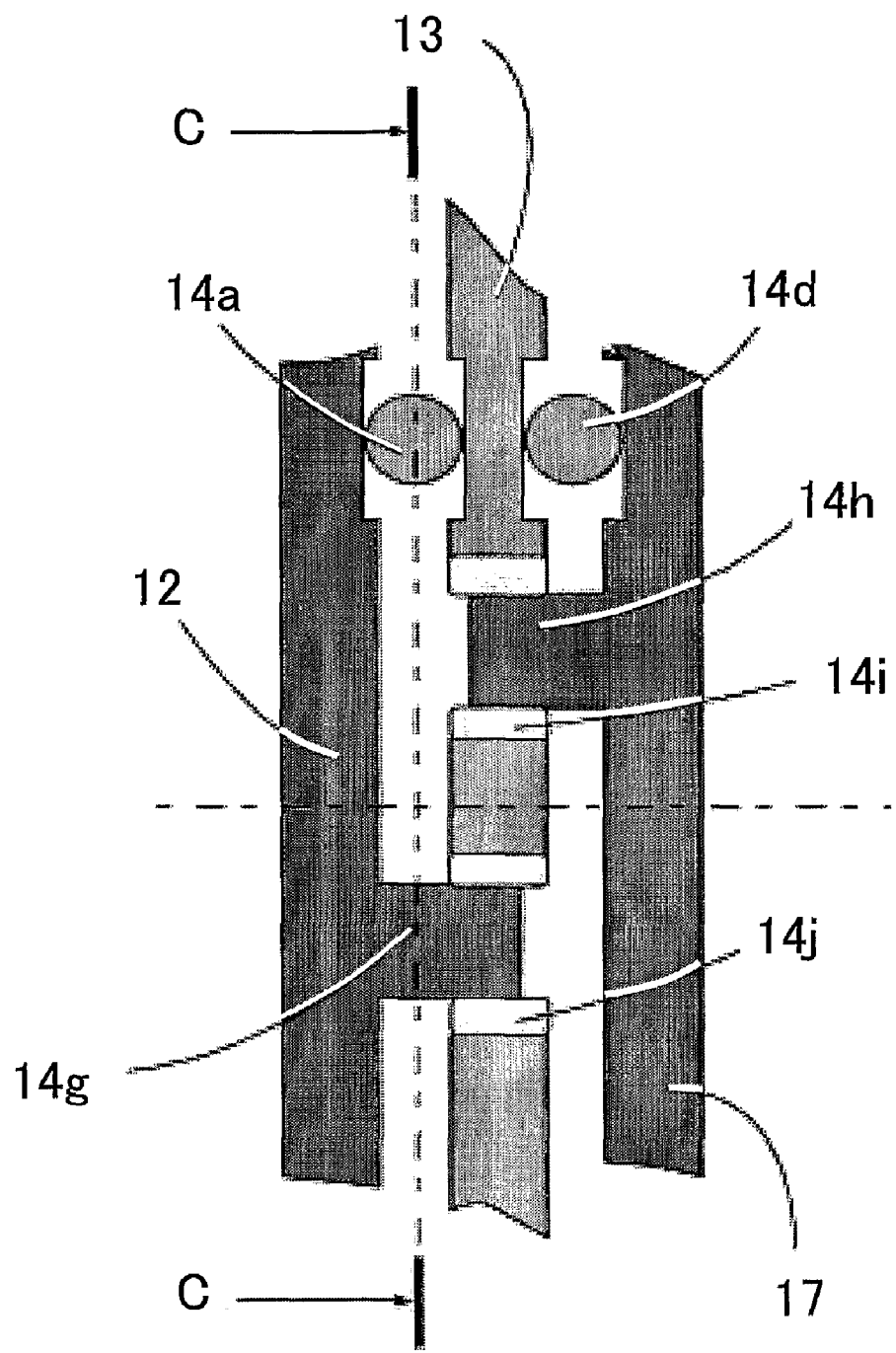
FIG. 12 is a partially-expanded view (front view) showing the optical image stabilizer of Embodiment 2.
Figure 13:
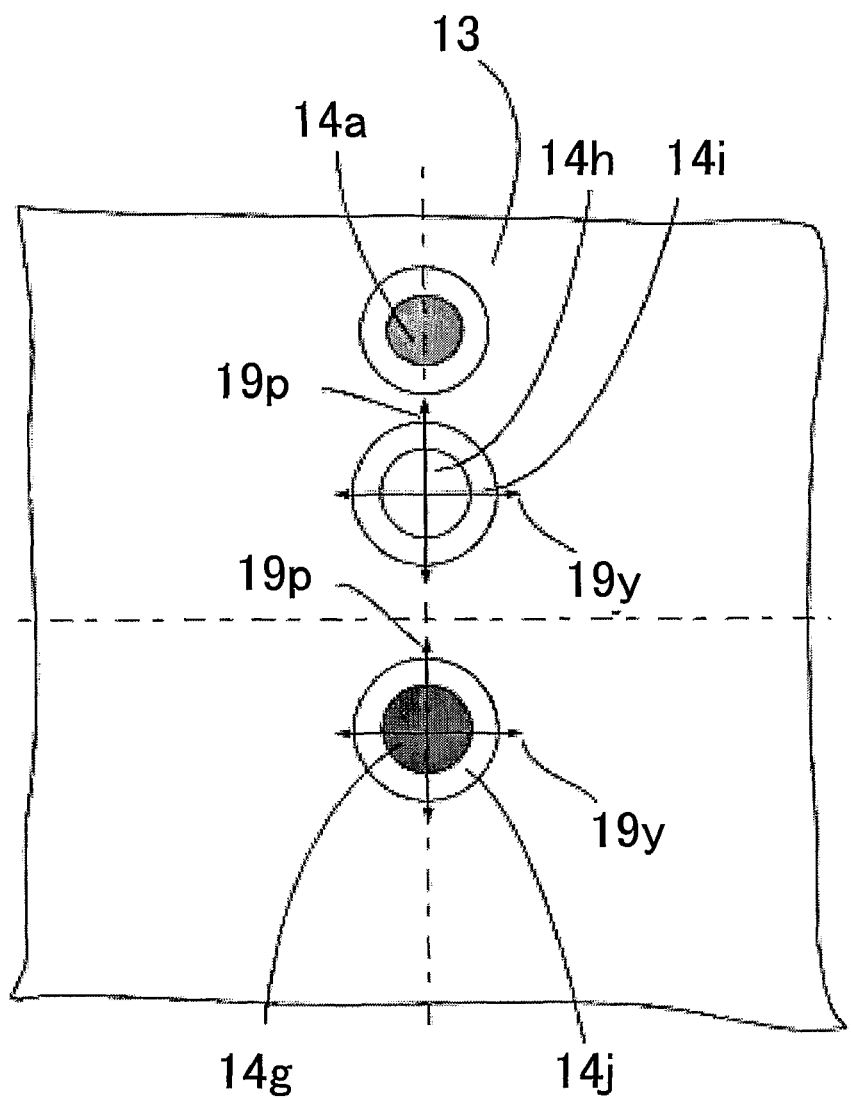
FIG. 13 is a partially expanded view (cross-sectional view) showing the optical image stabilizer of Embodiment 2.

FIG. 12 is an enlarged view showing the vicinity of the damper axes 14g and 14h in FIG. 11. FIG. 13 is a cross-sectional view taken along the line C-C in FIG. 12.

As shown in FIG. 12, the damper axis 14g provided on the holding frame 12 and the damper axis 14h provided on the holding frame 17 are both inserted into two round opening portions formed in the base plate 13. Damper members 14i and 14j are provided between the opening portions and the damper axes 14g and 14h.

The damper members 14i and 14j are a viscoelastic member such as UV-curable gel or rubber having a high damping effect).

When the holding frames 12 and 17 are moved in the pitch and yaw directions 19p and 19y, the damper axes 14g and 14h cause the damper members 14i and 14j to deform in the opening portions. Thereby, unnecessary vibrations of the holding frames 12 and 17 generated by the tension coil springs are absorbed to improve the quality of an observed image.

Also in this embodiment, a structure constituted by the first movable part including the positive correction lenses 11a and 11c and the holding frame 12, and the tension coil springs 15g to 15j is called as a first movable mechanism. Another structure constituted by the second movable part including the negative correction lenses 11b and 11d and the holding frame 17, and the tension coil springs 15k to 15n is called as a second movable mechanism. In this case, the first movable mechanism and the second movable mechanism may have natural frequencies that satisfy the condition (1) described in Embodiment 1. This can provide a similar effect to that described in Embodiment 1.

Also in this embodiment, the driving of the correction lenses having the opposite optical powers in positive and negative in the directions opposite to each other can improve the deflecting effect of the optical axis. Thus, even when the respective correction lenses have small driving strokes, a sufficient image-stabilization effective shake amount can be secured. Furthermore, a focal shift due to the displacement of the correction lenses due to their own weights can be reduced. Consequently, the focal shift due to changes in posture of the observation apparatus such as binoculars can be suppressed.

Moreover, dividing the correction lens into plural correction lenses can allow the respective correction lenses to have a lighter weight. Thus, the division of the correction lenses in addition to the above-described reduction of the driving strokes can reduce power consumption of the optical image stabilizer.

Furthermore, the common use of the magnet to drive the respective correction lenses having the opposite optical powers in positive and negative as described above can provide a compact actuator. Thus, the optical image stabilizer can have a smaller size. Moreover, the actuator constituted by the magnet and the coil can provide the driving of the correction lenses with high speed and good positional accuracy, thus improving image stabilization performance of the optical image stabilizer.

Embodiment 3

Figure 14:
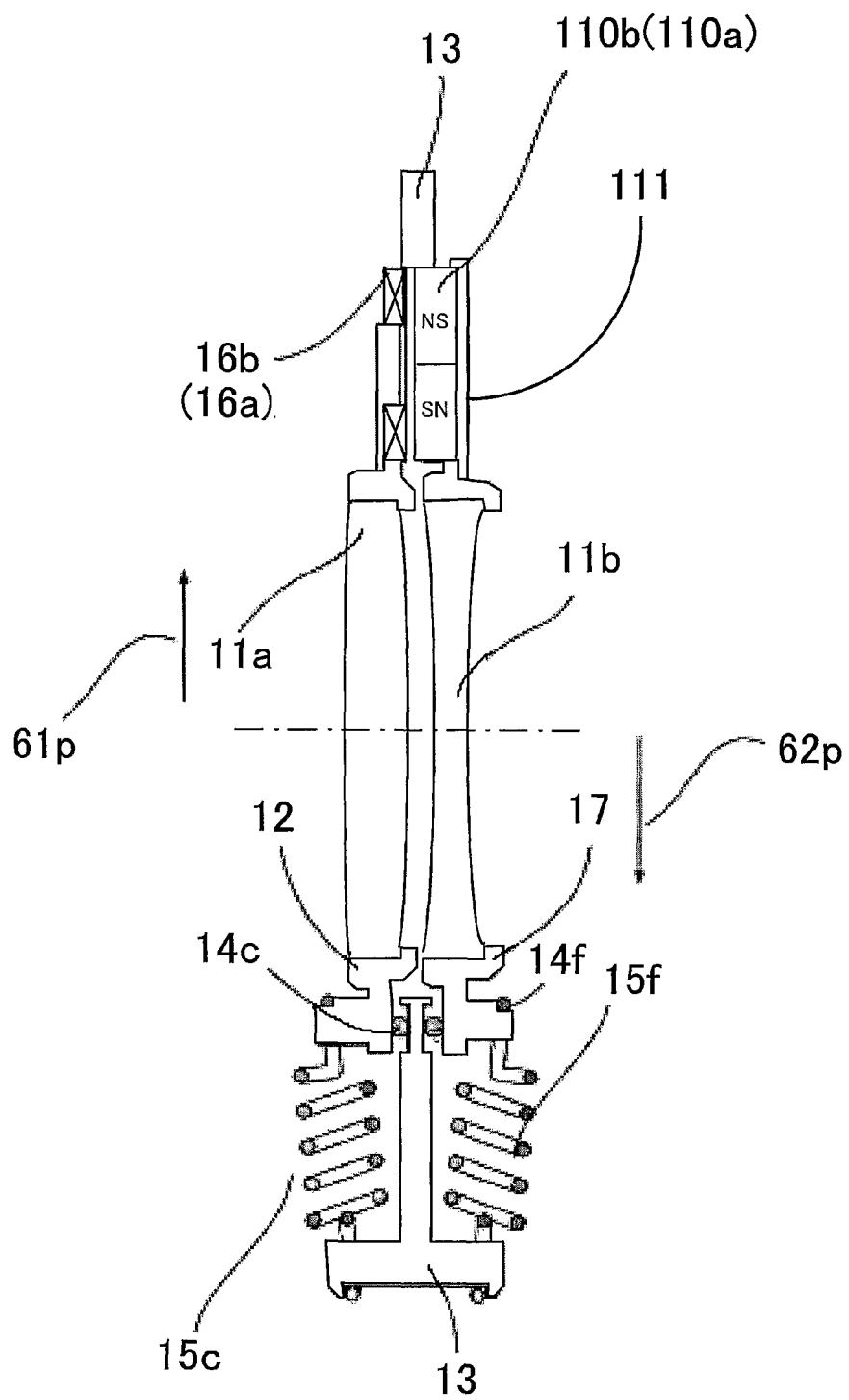
FIG. 14 is a cross-sectional view showing the optical image stabilizer that is a third embodiment (Embodiment 3) of the present invention.

FIG. 14 is a cross-sectional view showing an optical image stabilizer of a third embodiment (Embodiment 3) of the present invention. This optical image stabilizer is provided in the digital camera described in Embodiment 1. Although the optical image stabilizer of this embodiment basically has the same spring-hanging configuration as that of Embodiment 1, this embodiment is different from Embodiment 1 in the configuration of the actuator. It is noted that components in this embodiment identical to or having the same functions as those in Embodiment 1 are denoted with the same reference numerals as those in Embodiment 1, and their descriptions are omitted.

In this embodiment, the holding frame 12 holding the positive correction lens 11a is provided with the coils 16a and 16b. The holding frame 17 holding the negative correction lens 11b is provided with the magnets 110a and 110b. Although the coil 16a and the magnet 110a are not shown in the figure, the arrangement of the coils 16a and 16b and the magnets 110a and 110b when viewed from the front is the same as that of Embodiment 1 (FIG. 1).

In this embodiment, the magnet 110b is absorbed by a yoke 111 provided on the holding frame 17 and thus is strongly fixed to the holding frame 17. The yoke 111 substantially increases the thickness of the magnet 110b, thus increasing coercivity thereof.

A case is assumed where an electric current is applied to the coil 16b to drive the first movable part constituted by the coil 16b and the holding frame 12 with respect to the magnet 110b in the direction shown by the arrow 61p. In this case, the magnet 110b receives a reaction force of the thrust force that drives the coil 16b in the direction shown by the arrow 61p. This reaction force as a thrust force drives the second movable part constituted by the magnet 110b and the holding frame 17 in the direction shown by the arrow 62p. Specifically, the energization of the coil 16b can drive the first and second movable parts in directions opposite to each other by the action and reaction. This also applies to the coil 16a and the magnet 110a.

When this embodiment uses the coil, magnet, electric current values, and spring constants similar to those in Embodiment 1, the relative driving amount of the first and second movable parts (holding frames 12 and 17) is a half of that in Embodiment 1. However, it is not necessary that the second movable part has a coil, which reduces the sizes of the actuator and the optical image stabilizer, compared to those in Embodiment 1.

Also in this embodiment, the first movable mechanism constituted by the first movable part and the tension coil springs 15a to 15c and the second movable mechanism constituted by the second movable part and the three tension coil springs 15f may have natural frequencies that satisfy the condition (1). Thereby, this embodiment can provide effects similar to those of Embodiment 1. Furthermore, the spring constant of the tension coil springs 15a to 15c identical with that of the three tension coil springs 15f can provide the driving of the first and second movable parts by the same amount in directions opposite to each other.

Furthermore, the first movable part and the second movable part having the same mass can provide the same displacement direction and the same displacement amount of the correction lenses 11a and 11b. Thus, the decentering of the optical axis due to the displacements of the first and second movable parts due to their own weights can be reduced.

Embodiment 4

Figure 15:
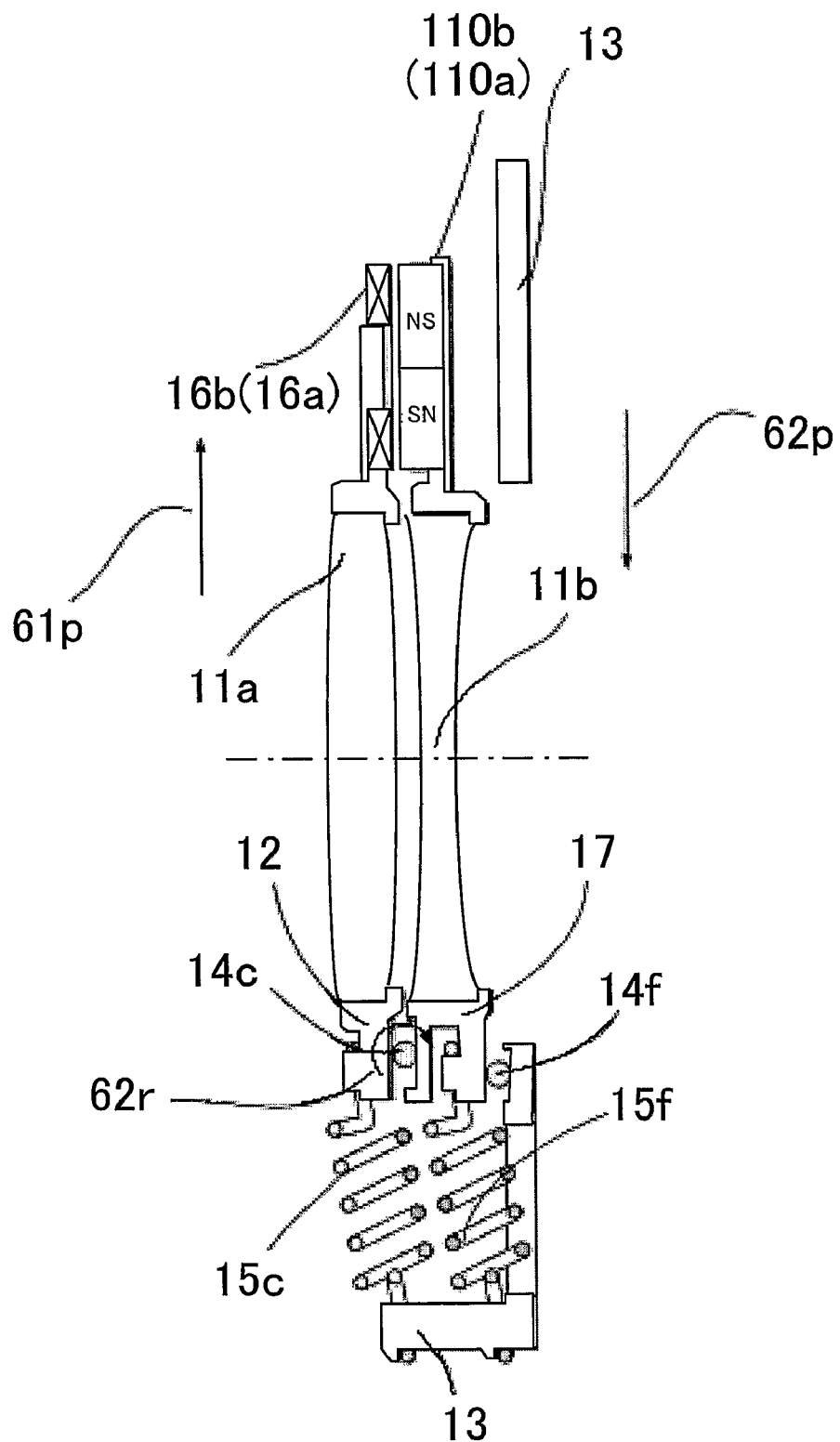
FIG. 15 is a cross-sectional view showing an optical image stabilizer that is a fourth embodiment (Embodiment 4) of the present invention.

FIG. 15 is a cross-sectional view showing an optical image stabilizer that is a fourth embodiment (Embodiment 4) of the present invention. This optical image stabilizer is provided in the digital camera described in Embodiment 1. Although the optical image stabilizer of this embodiment has the actuator having the same configuration as that of Embodiment 3, this embodiment is different from Embodiments 1 and 3 in the spring-hanging configuration. It is noted that components in this embodiment identical to or having the same functions as those in Embodiment 1 are denoted with the same reference numerals as those in Embodiment 1, and their descriptions are omitted.

In this embodiment, the holding frame 17 holding the negative correction lens 11b is guided in the pitch direction and the yaw direction by the three balls 14f provided between the back face of the holding frame 17 and the front face of the base plate 13. That is, the holding frame 17 is prevented from being moved in the optical axis direction by the base plate 13 and the balls 14f.

On the other hand, the holding frame 12 holding the positive correction lens 11a is guided in the pitch direction and the yaw direction by the balls 14a to 14c provided between the back face the holding frame 12 and the front face of the holding frame 17. In other words, the holding frame 12 is prevented from being moved in the optical axis direction by the balls 14a to 14c, the holding frame 17, the balls 14f, and the base plate 13.

Three tension coil springs 15*f* are obliquely hooked similarly to those in Embodiment 1 between the holding frame 17 and the base plate 13. However, the tension coil springs 15*f* are hooked with different inclination directions from those in Embodiment 1. The tension coil springs 15*a* to 15*c* (among which only the tension coil spring 15*c* is shown in the figure) are obliquely hooked between the holding frame 12 and the base plate 13 similarly to those in Embodiment 1. As in Embodiment 3, a case is assumed, for example, where an electric current is applied to the coil 16*b* to drive the first movable part constituted by the coil 16*b* and the holding frame 12 with respect to the magnet 110*b* in the direction shown by the arrow 61*p*. In this case, the magnet 110*b* receives a reaction force of the thrust force that drives the coil 16*b* in the direction shown by the arrow 61*p*. This reaction force as a thrust force drives the second movable part constituted by the magnet 110*b* and the holding frame 17 in the direction shown by the arrow 62*p*. Specifically, the energization of the coil 16*b* can drive the first and second movable parts in directions opposite to each other by the action and reaction. This also applies to the coil 16*a* and the magnet 110*a* that are not shown.

Also in this embodiment, the first movable mechanism constituted by the first movable part and the tension coil springs 15*a* to 15*c* and the second movable mechanism constituted by the second movable part and the three tension coil springs 15*f* may have natural frequencies satisfying the condition (1).

In this embodiment, when the holding frame 12 is driven in the direction shown by the arrow 61*p* in FIG. 15, the ball 14*c* is rotated in a direction shown by an arrow 62*r*. The rotational force thereof drives the holding frame 17 in the direction shown by the arrow 62*p*, and the driving amount thereof is determined based on the rotation amount of the ball 14*c*. Since the rotation amount of the ball 14*c* is determined based on the driving amount of the holding frame 12, the holding frame 12 and the holding frame 17 are moved by the same amount in directions opposite to each other. This enables control of the movement amounts of the holding frames 12 and holding frame 17 with higher accuracy than in Embodiment 3.

As described above, in this embodiment, the configuration in which the first movable part is supported by the base plate 13 via the second movable part provides an effect that the first movable part can accurately control the movement amount of the second movable part.

Embodiment 5

Figure 16:
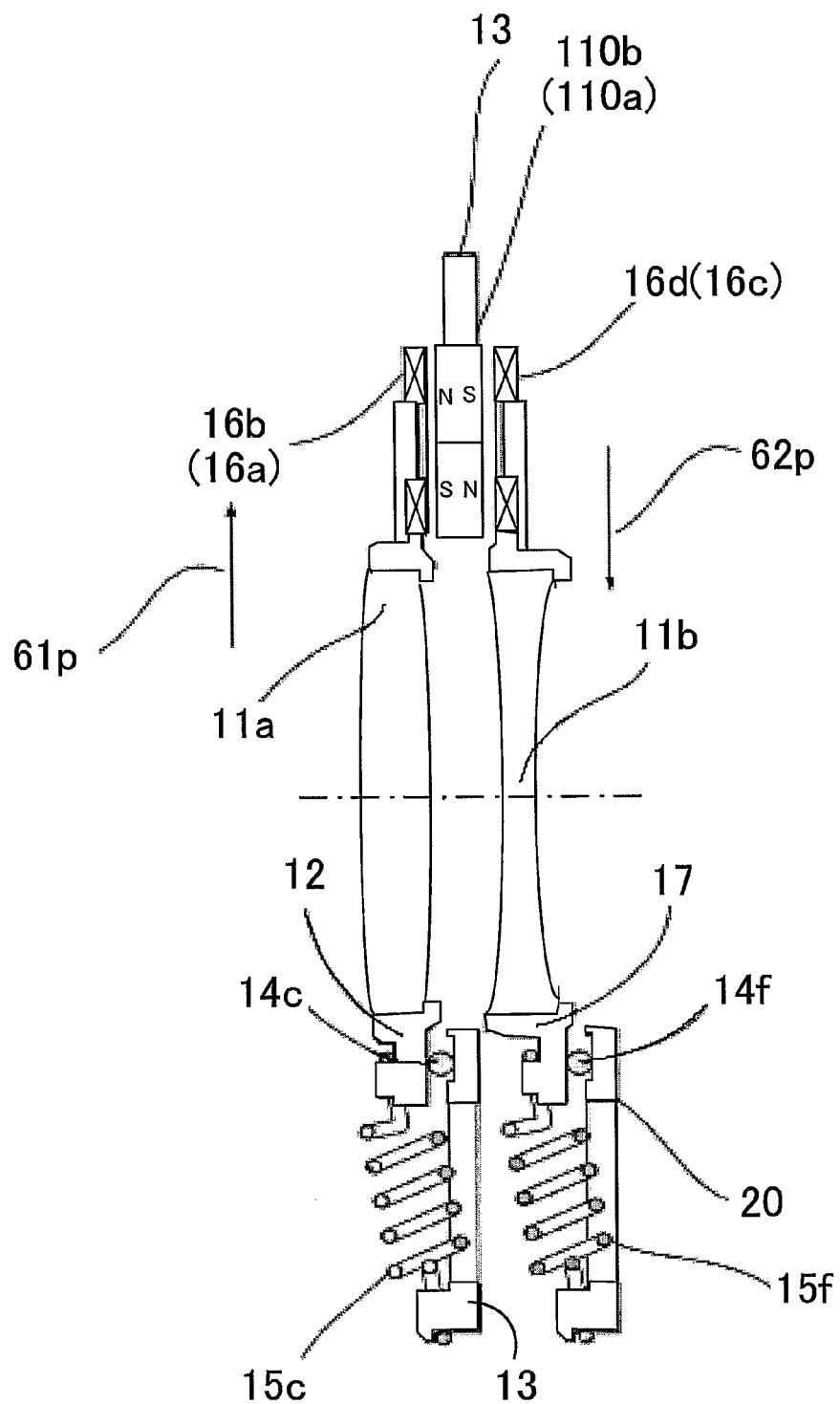
FIG. 16 is a cross-sectional view showing an optical image stabilizer that is a fifth embodiment (Embodiment 5) of the present invention.

FIG. 16 is a cross-sectional view showing an optical image stabilizer that is a fifth embodiment (Embodiment 5) of the present invention. This optical image stabilizer is provided in the digital camera described in Embodiment 1. The optical image stabilizer of this embodiment has the same actuator configuration as that of Embodiment 1, but is different from Embodiment 1 in the spring-hanging configuration. It is noted that components in this embodiment identical to or having the same functions as those in Embodiment 1 are denoted with the same reference numerals as those in Embodiment 1, and their descriptions are omitted.

In this embodiment, the holding frame 12 holding the positive correction lens 11*a* is supported by the base plate 13 so as to be movable in the pitch direction and the yaw direction. However, the holding frame 17 holding the negative correction lens 11*b* is supported by a base plate 20 separately provided from the base plate 13 such that the holding frame 17 is movable in the pitch direction and the yaw direction.

Specifically, the three tension coil springs 15*a* to 15*c* (among which only the tension coil spring 15*c* is shown in the figure) are obliquely hooked between the holding frame 12 and the base plate 13 as in Embodiment 1. On the other hand, the three tension coil springs 15*f* are obliquely hooked between the holding frame 17 and the base plate 20.

The holding frame 12 is guided in the pitch direction and the yaw direction by the balls 14*a* to 14*c* provided between the holding frame 12 and the base plate 13. The holding frame 12 is prevented from being moved in the optical axis direction by the base plate 13 and the balls 14*a* to 14*c*.

On the other hand, the holding frame 17 is guided in the pitch direction and the yaw direction by the three balls 14*f* provided between the holding frame 17 and the base plate 20. The holding frame 17 is prevented from being moved in the optical axis direction by the base plate 20 and the balls 14*f*. The base plate 13 is provided with the magnet 110*b* as in Embodiment 1. The coils 16*b* and 16*d* provided on the holding frames 12 and 17 respectively face the front face and back face of the magnet 110*b*. The base plate 13 is also provided with the magnet 110*a* (not shown) as in Embodiment 1. The coils 16*a* and 16*c* provided on the holding frames 12 and 17 respectively face the front face and back face of the magnet 110*a*.

As in Embodiment 1, when an electric current is applied to the coil 16*b* for example, the first movable part constituted by the positive correction lens 11*a* and the holding frame 12 is driven in the direction shown by the arrow 61*p*. When an electric current is then applied to the coil 16*d* in a direction opposite to that of the electric current applied to the coil 16*b*, the second movable part constituted by the negative correction lens 11*b* and the holding frame 17 is driven in the direction shown by the arrow 62*p* opposite to that shown by the arrow 61*p*.

Also in this embodiment, the first movable mechanism constituted by the first movable part and the tension coil springs 15*a* to 15*c* and the second movable mechanism constituted by the second movable part and the three tension coil springs 15*f* may have natural frequencies satisfying the condition (1). This can provide effects similar to those in Embodiment 1. Furthermore, the spring constant of the tension coil springs 15*a* to 15*c* identical with the spring constant of the tension coil springs 15*f* can provide the driving of the first and second movable parts by the same amount in directions opposite to each other.

In this embodiment, the first and second movable parts are supported by the base plates 13 and 20, respectively. Thus, positional adjustment (adjustment in inclination and parallel decentering) of the positive and negative correction lenses 11*a* and 11*b* can be individually performed. Therefore, the optical image stabilizer having higher performance can be configured.

Embodiment 6

Figure 17:
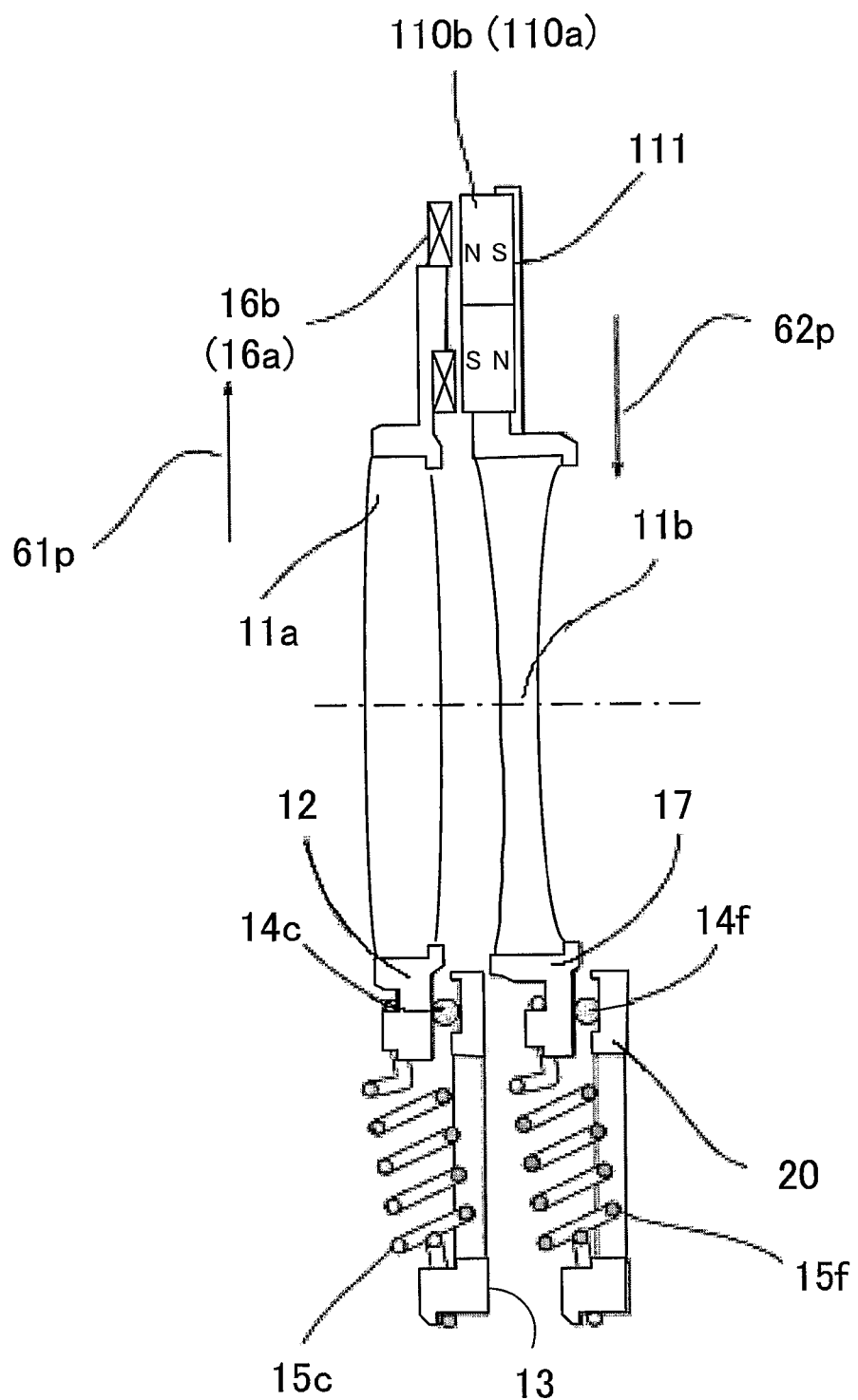
FIG. 17 is a cross-sectional view showing an optical image stabilizer that is a sixth embodiment (Embodiment 6) of the present invention.

FIG. 17 is a cross-sectional view showing an optical image stabilizer that is a sixth embodiment (Embodiment 6) of the present invention. This optical image stabilizer is provided in the digital camera described in Embodiment 1. In the optical image stabilizer of this embodiment, the first and second movable parts are supported by the base plates 13 and 20 as in Embodiment 5, and the actuator shown in Embodiment 3 is used. It is noted that components in this embodiment identical to or having the same functions as those in Embodiments 1 and 5 are denoted with the same reference numerals as those in Embodiments 1 and 5, and their descriptions are omitted. According to this embodiment, positional adjustment of the positive correction lens 11a and the negative correction lens 11b can be individually performed as in Embodiment 5. Furthermore, as in Embodiment 3, the energization of the coil 16b provides the action and reaction between the coil 16b and the magnet 110b provided on the holding frame 17 to drive the first and second movable parts in directions opposite to each other. Therefore, the sizes of the actuator and the optical image stabilizer can be reduced.

Also in this embodiment, the first movable mechanism constituted by the first movable part and the tension coil springs 15a to 15c and the second movable mechanism constituted by the second movable part and the three tension coil springs 15f may have natural frequencies satisfying the condition (1). This can provide effects similar to those of Embodiment 1. Furthermore, the spring constant of the tension coil springs 15a to 15c identical with that of the three tension coil springs 15f can provide the driving of the first and second movable parts by the same amount in directions opposite to each other.

Moreover, the first movable part having the same mass as that of the second movable part can allow the correction lenses 11a and 11b to be displaced by the same amount in the same direction. Thus, the decentering of the optical axis due to the displacements of the first and second movable parts due to their own weights can be reduced.

The optical image stabilizers of Embodiments 3 to 6 can be applied also to the observation apparatus such as binoculars described in Embodiment 2.

Although the above respective embodiments have described the spring-hanging-type optical image stabilizer, the configuration of the actuator described in the above respective embodiments can be applied also to optical image stabilizers other than the spring-hanging-type one.

As described above, in the respective embodiments, the first and second lenses having opposite optical powers in positive and negative are moved in directions opposite to each other to obtain the image stabilizing effect. Thus, according to the respective embodiments, each of the first and second lenses can have a light weight and a small driving stroke to provide an image stabilizing effect for a certain degree of large shake. Therefore, power consumption of the optical image stabilizer can be reduced. Furthermore, the focal shift for the displacement of the lens can be suppressed. Moreover, the actuator that drives the first and second lenses has a compact configuration using the magnet and the coil. Thus, the entire optical image stabilizer can have a smaller size, the lens can be driven with a high speed, and the image stabilization performance can be improved.

Furthermore, the present invention is not limited to these embodiments and various variations and modifications may be made without departing from the scope of the present invention.

This application claims the benefit of Japanese Patent Application No. 2007-134875, filed on May 22, 2007, which is hereby incorporated by reference herein in its entirety.

FIELD OF INDUSTRIAL APPLICATION

A compact optical image stabilizer and a compact optical apparatus including this optical image stabilizer are realized that can provide an image stabilizing effect even for a certain degree of large shake, can reduce focal shifts, and can improve image stabilization performance.

The invention claimed is:

1. An optical image stabilizer, comprising:
a first movable part that includes a first lens having one of positive and negative optical powers;
a second movable part that includes a second lens having the other of the positive and negative optical powers;
a supporting member that supports the first and second movable parts such that the first and second movable parts are movable in directions different from a direction of an optical axis; and
an actuator that drives the first and second movable parts in the directions opposite to each other with respect to the supporting member,
wherein the actuator includes:
a first element that is provided on the supporting member;
a second element that is provided on the first movable part and faces a first face of the first element; and
a third element that is provided on the second movable part and faces a second face formed on an opposite side of the first element from the first face, and
wherein the first element is one of a magnet and a coil, and the second element and the third element are the other of the magnet and the coil.

2. The optical image stabilizer according to claim 1, further comprising:
a first elastic member that is provided between the first movable part and the supporting member, and that elastically supports the first movable part in the direction different from the optical axis direction; and
a second elastic member that is provided between the second movable part and the supporting member, and that elastically supports the second movable part in the direction different from the optical axis direction.

3. The optical image stabilizer according to claim 2, wherein the following condition is satisfied:

$$0.7 \leq NF1/NF2 \leq 1.4,$$

where NF1 represents a natural frequency of a first movable mechanism including the first movable part and the first elastic member, and NF2 represents a natural frequency of a second movable mechanism including the second movable part and the second elastic member.

4. The optical image stabilizer according to claim 1, wherein the first movable part is guided in the direction different from the optical axis direction with balls provided between the first movable part and the supporting member or the second movable part, and the second movable part is guided in the direction different from the optical axis direction with balls provided between the second movable part and the supporting member or the first movable part.

5. The optical image stabilizer according to claim 1, wherein the optical image stabilizer includes as the supporting member a first supporting member that supports the first movable part and a second supporting member that supports the second movable part.

6. An optical apparatus comprising the optical image stabilizer according to claim 1.

7. An optical image stabilizer, comprising:
a first movable part including a first lens having one of positive and negative optical powers;
a second movable part including a second lens having the other of the positive and negative optical powers;
a supporting member that supports the first and second movable parts such that the first and second movable parts are movable in directions different from a direction of an optical axis; and
an actuator that drives the first and second movable parts in directions opposite to each other with respect to the supporting member,
wherein the actuator includes:

a magnet that is provided on one of the first and second movable parts; and a coil that is provided on the other of the first and second movable parts.

8. The optical image stabilizer according to claim 7, further comprising:

a first elastic member that is provided between the first movable part and the supporting member, and that elastically supports the first movable part in the direction different from the optical axis direction; and a second elastic member that is provided between the second movable part and the supporting member, and that elastically supports the second movable part in the direction different from the optical axis direction.

9. The optical image stabilizer according to claim 8, wherein the following condition is satisfied:

$$0.7 \leq NF1/NF2 \leq 1.4,$$

where NF1 represents a natural frequency of the first movable mechanism including the first movable part and the first elastic member, and NF2 represents a natural frequency of the second movable mechanism including the second movable part and the second elastic member.

10. The optical image stabilizer according to claim 7, wherein the first movable part is guided in the direction different from the optical axis direction with balls provided between the first movable part and the supporting member or the second movable part, and the second movable part is guided in the direction different from the optical axis direction with balls provided between the second movable part and the supporting member or the first movable part.

11. The optical image stabilizer according to claim 7, wherein the optical image stabilizer includes as the supporting member a first supporting member that supports the first movable part and a second supporting member that supports the second movable part.

12. An optical apparatus comprising the optical image stabilizer according to claim 7.

* * * * *